(12) United States Patent
Brassard et al.

(10) Patent No.: US 7,191,429 B2
(45) Date of Patent: Mar. 13, 2007

(54) SYSTEM AND METHOD FOR MANAGING ARCHITECTURAL LAYERS WITHIN A SOFTWARE MODEL

(75) Inventors: Michel Brassard, Montréal (CA); Neil Pitman, Montreal (CA)

(73) Assignee: Manyeta Informatique Inc., St. Bruno (CA)

( * ) Notice: Subject to any disclaimer, the term of this patent is extended or adjusted under 35 U.S.C. 154(b) by 589 days.

(21) Appl. No.: 10/256,206

(22) Filed: Sep. 27, 2002

(65) Prior Publication Data

US 2003/0074648 A1 Apr. 17, 2003

Related U.S. Application Data

(60) Provisional application No. 60/325,196, filed on Sep. 28, 2001.

(51) Int. Cl.
*G06F 9/44* (2006.01)
*G06F 9/45* (2006.01)

(52) U.S. Cl. ........................ 717/104; 717/109; 717/113

(58) Field of Classification Search ........ 717/104–110, 717/120–122, 113; 707/203
See application file for complete search history.

(56) References Cited

U.S. PATENT DOCUMENTS

| | | | | |
|---|---|---|---|---|
| 5,398,336 | A * | 3/1995 | Tantry et al. | 707/103 R |
| 5,548,756 | A * | 8/1996 | Tantry et al. | 707/10 |
| 6,167,563 | A * | 12/2000 | Fontana et al. | 717/107 |
| 6,269,473 | B1 * | 7/2001 | Freed et al. | 717/104 |
| 6,327,698 | B1 * | 12/2001 | Kolluru | 717/104 |
| 6,381,743 | B1 * | 4/2002 | Mutschler, III | 717/104 |
| 6,408,311 | B1 * | 6/2002 | Baisley et al. | 707/203 |
| 6,742,175 | B1 * | 5/2004 | Brassard | 717/107 |
| 6,769,095 | B1 * | 7/2004 | Brassard et al. | 715/513 |
| 6,874,146 | B1 * | 3/2005 | Iyengar | 719/313 |
| 6,944,848 | B2 * | 9/2005 | Hartman et al. | 717/124 |

OTHER PUBLICATIONS

Fu et al, "An approach to validation of software architecture model" IEEE APSEC, pp. 375-384, 2005.*
Verdickt et al, "Automatic inclusion of midleware performance attributes into architectural UML software models", IEEE Trans on Software Engineering vol. 31, No. 8, pp. 695-711, 2005.*
Qin et al,"A formal concurrency model based architecture description language for synthesis of software development tools", ACM LCTES, pp. 47-56, 2004.*

(Continued)

*Primary Examiner*—Anil Khatri
(74) *Attorney, Agent, or Firm*—Roberts & Roberts, LLP

(57) ABSTRACT

A system and method are presented in which the system manages the properties related to the architectural layers within the context of software development. It provides mechanisms to define the architectural layers and the additional information required by them. The method for specifying a software model comprises specifying at least one architectural layer for a software system; specifying at least one property and relating each the at least one property to one of the at least one architectural layer and to at least one model element type to which the at least one property is attached; and automatically providing assistance for specifying property contents of the at least one property using an architecture layer corresponding to the at least one property for each one of a plurality of model elements to be defined as part of a software model of the software system.

58 Claims, 32 Drawing Sheets

OTHER PUBLICATIONS

Sangal et al, "Using dependency models to manage complex software archiecture", ACM OOPSLA, pp. 167176, 2005.*

Grundy, "Software Architecture Modelling, Analysis and implementation with SoftArch", 34th IEEE Inten. Cont. of Systems Sciences, Jan. 3, 2001, 9 pages.

Harmon, "The Rising Tide of MDA", Online! Jul. 2001, 3 pages.

Bottger et al., "An Object—Oriented Model for Specification, Prototyping, Implementation and Reuse", Design Automation and Test in Europe, Feb. 23, 1998, pp. 303-310.

Miller et al., "Model Driven Architecture (MDA)", Jul. 9, 2001, XP002263572, pp. 1-31.

* cited by examiner

```xml
<?xml version="1.0" encoding="UTF-8"?>
<xs:schema xmlns:xs=http://www.w3.org/2001/XMLSchema
        elementFormDefault="qualified">
    <xs:element name="ArchitecturalDefinition">
        <xs:complexType>
            <xs:sequence>
                <xs:element ref="ArchitecturalLayers" minOccurs="0"/>
                <xs:element ref="ArchitecturalIssues" minOccurs="0"/>
                <xs:element ref="ArchitecturalStereotypes"
                        minOccurs="0"/>
            </xs:sequence>
            <xs:attribute name="VERSION" type="xs:string"/>
        </xs:complexType>
    </xs:element>
    <xs:element name="ArchitecturalIssue">
        <xs:complexType>
            <xs:sequence minOccurs="0">
                <xs:element ref="Caption"/>
                <xs:element ref="Description"/>
                <xs:choice minOccurs="0">
                    <xs:element ref="TaggedValues"/>
                </xs:choice>
            </xs:sequence>
            <xs:attribute name="ID" type="xs:ID"/>
            <xs:attribute name="NAME" type="xs:string"/>
            <xs:attribute name="VERSION" type="xs:string"/>
            <xs:attribute name="GENITPROJECT" type="xs:string"/>
            <xs:attribute name="IDREF" type="xs:string"/>
        </xs:complexType>
    </xs:element>
```

FIGURE 24A

```xml
<xs:element name="ArchitecturalIssues">
    <xs:complexType>
        <xs:sequence minOccurs="0">
            <xs:element ref="ArchitecturalIssue" minOccurs="0"
                maxOccurs="unbounded"/>
        </xs:sequence>
    </xs:complexType>
</xs:element>
<xs:element name="ArchitecturalLayer">
    <xs:complexType>
        <xs:sequence minOccurs="0">
            <xs:element ref="Caption"/>
            <xs:element ref="Description"/>
            <xs:choice minOccurs="0">
                <xs:element ref="ArchitecturalIssues"/>
            </xs:choice>
        </xs:sequence>
        <xs:attribute name="ID" type="xs:ID"/>
        <xs:attribute name="NAME" type="xs:string"/>
        <xs:attribute name="VERSION" type="xs:string"/>
    </xs:complexType>
</xs:element>
<xs:element name="ArchitecturalLayers">
    <xs:complexType>
        <xs:sequence minOccurs="0">
            <xs:element ref="ArchitecturalLayer" minOccurs="0"
                maxOccurs="unbounded"/>
        </xs:sequence>
    </xs:complexType>
</xs:element>
```

FIGURE 24B

```xml
<xs:element name="ArchitecturalStereotype">
    <xs:complexType>
        <xs:sequence minOccurs="0">
            <xs:element ref="Caption"/>
            <xs:element ref="Description"/>
            <xs:element ref="UMLElements" minOccurs="0"/>
        </xs:sequence>
        <xs:attribute name="ID" type="xs:ID"/>
        <xs:attribute name="NAME" type="xs:string"/>
        <xs:attribute name="VERSION" type="xs:string"/>
        <xs:attribute name="IDREF" type="xs:string"/>
    </xs:complexType>
</xs:element>
<xs:element name="ArchitecturalStereotypes">
    <xs:complexType>
        <xs:sequence minOccurs="0">
            <xs:element ref="ArchitecturalStereotype"
                minOccurs="0" maxOccurs="unbounded"/>
        </xs:sequence>
    </xs:complexType>
</xs:element>
<xs:element name="Caption" type="xs:string"/>
<xs:element name="DefaultValue" type="xs:string"/>
<xs:element name="Description" type="xs:string"/>
<xs:element name="LegalValue">
    <xs:complexType>
        <xs:sequence>
            <xs:element ref="Value"/>
        </xs:sequence>
    </xs:complexType>
</xs:element>
```

FIGURE 24C

```
<xs:element name="LegalValues">
    <xs:complexType>
        <xs:sequence>
            <xs:element ref="LegalValue" minOccurs="0"
                maxOccurs="unbounded"/>
        </xs:sequence>
    </xs:complexType>
</xs:element>
<xs:element name="StereotypeDefaultValue">
    <xs:complexType>
        <xs:sequence minOccurs="0" maxOccurs="unbounded">
            <xs:element ref="DefaultValue"/>
            <xs:element ref="ArchitecturalStereotype"/>
        </xs:sequence>
        <xs:attribute name="ISOVERRIDE" default="False">
            <xs:simpleType>
                <xs:restriction base="xs:NMTOKEN">
                    <xs:enumeration value="True"/>
                    <xs:enumeration value="False"/>
                </xs:restriction>
            </xs:simpleType>
        </xs:attribute>
    </xs:complexType>
</xs:element>
```

FIGURE 24D

```xml
<xs:element name="StereotypeDefaultValues">
    <xs:complexType>
        <xs:sequence minOccurs="0">
            <xs:element ref="StereotypeDefaultValue"
                minOccurs="0" maxOccurs="unbounded"/>
        </xs:sequence>
    </xs:complexType>
</xs:element>
<xs:element name="TaggedValue">
    <xs:complexType>
        <xs:sequence minOccurs="0">
            <xs:element ref="Caption"/>
            <xs:element ref="Description"/>
            <xs:sequence>
                <xs:element ref="UMLElementTypes"
                    minOccurs="0"/>
                <xs:element ref="LegalValues" minOccurs="0"/>
            </xs:sequence>
        </xs:sequence>
        <xs:attribute name="ID" type="xs:ID"/>
        <xs:attribute name="NAME" type="xs:string"/>
        <xs:attribute name="VERSION" type="xs:string"/>
        <xs:attribute name="ISREADONLY" default="False">
            <xs:simpleType>
                <xs:restriction base="xs:NMTOKEN">
                    <xs:enumeration value="True"/>
                    <xs:enumeration value="False"/>
                </xs:restriction>
            </xs:simpleType>
        </xs:attribute>
```

FIGURE 24E

```
<xs:attribute name="ISVISIBLE" default="True">
    <xs:simpleType>
        <xs:restriction base="xs:NMTOKEN">
            <xs:enumeration value="True"/>
            <xs:enumeration value="False"/>
        </xs:restriction>
    </xs:simpleType>
</xs:attribute>
<xs:attribute name="ISMANDATORY" default="False">
    <xs:simpleType>
        <xs:restriction base="xs:NMTOKEN">
            <xs:enumeration value="True"/>
            <xs:enumeration value="False"/>
        </xs:restriction>
    </xs:simpleType>
</xs:attribute>
<xs:attribute name="ISENUMERATION" default="False">
    <xs:simpleType>
        <xs:restriction base="xs:NMTOKEN">
            <xs:enumeration value="True"/>
            <xs:enumeration value="False"/>
        </xs:restriction>
    </xs:simpleType>
</xs:attribute>
```

FIGURE 24F

```xml
            <xs:attribute name="TYPE" default="String">
                <xs:simpleType>
                    <xs:restriction base="xs:NMTOKEN">
                        <xs:enumeration value="Boolean"/>
                        <xs:enumeration value="Char"/>
                        <xs:enumeration value="Integer"/>
                        <xs:enumeration value="Double"/>
                        <xs:enumeration value="Date"/>
                        <xs:enumeration value="String"/>
                        <xs:enumeration value="File"/>
                    </xs:restriction>
                </xs:simpleType>
            </xs:attribute>
            <xs:attribute name="SEQUENCEORDER" type="xs:string"/>
        </xs:complexType>
</xs:element>
<xs:element name="TaggedValues">
    <xs:complexType>
        <xs:sequence>
            <xs:element ref="TaggedValue" minOccurs="0"
                    maxOccurs="unbounded"/>
        </xs:sequence>
    </xs:complexType>
</xs:element>
<xs:element name="UMLElement" type="xs:string"/>
<xs:element name="UMLElementType">
    <xs:complexType>
```

FIGURE 24G

```xml
<xs:sequence>
    <xs:element ref="DefaultValue"/>
    <xs:element ref="StereotypeDefaultValues"
        minOccurs="0"/>
</xs:sequence>
<xs:attribute name="NAME" default="Model">
    <xs:simpleType>
        <xs:restriction base="xs:NMTOKEN">
            <xs:enumeration value="Model"/>
            <xs:enumeration value="Package"/>
            <xs:enumeration value="Class"/>
            <xs:enumeration value="Association"/>
            <xs:enumeration value="Attribute"/>
            <xs:enumeration value="Operation"/>
            <xs:enumeration value="Role"/>
            <xs:enumeration value="Dependency"/>
            <xs:enumeration value="Generalization"/>
            <xs:enumeration value="StateMachine"/>
            <xs:enumeration value="Partition"/>
            <xs:enumeration value="State"/>
            <xs:enumeration value="Transition"/>
            <xs:enumeration value="Event"/>
            <xs:enumeration value="Action"/>
            <xs:enumeration value="Usecase"/>
            <xs:enumeration value="Actor"/>
            <xs:enumeration value="Parameter"/>
        </xs:restriction>
    </xs:simpleType>
</xs:attribute>
</xs:complexType>
</xs:element>
```

FIGURE 24H

```
<xs:element name="UMLElementTypes">
    <xs:complexType>
        <xs:sequence>
            <xs:element ref="UMLElementType"
                maxOccurs="unbounded"/>
        </xs:sequence>
    </xs:complexType>
</xs:element>
<xs:element name="UMLElements">
    <xs:complexType>
        <xs:sequence minOccurs="0" maxOccurs="unbounded">
            <xs:element ref="UMLElement"/>
        </xs:sequence>
    </xs:complexType>
</xs:element>
<xs:element name="Value" type="xs:string"/>
</xs:schema>
```

FIGURE 24I

SYSTEM AND METHOD FOR MANAGING ARCHITECTURAL LAYERS WITHIN A SOFTWARE MODEL

CROSS-REFERENCE TO RELATED APPLICATIONS

The application claims priority of U.S. provisional patent application No. 60/325,196 filed Sep. 28, 2001.

FIELD OF THE INVENTION

The present invention relates to managing the design of software models. More particularly, it relates to a system and method for managing architectural layers within a software model.

TERMS

For the purpose of the present invention, the following terms are defined below:

Software system: An application to be developed.

Software model: An abstraction of a software system.

Model element: An atomic constituent of a software model. A model element has relationships with other model elements and a set of property values. An example of a model element is a component or a class called "Customer," which represents all customers managed by a developed software application with predefined attributes representing unique characteristics like first name, last name, birth date, etc.

Model element type: One of the valid types of model elements to be found within a software model. The model element type determines the role, valid relationships with other model elements, and properties of the model element. Examples of model element types are class, attribute, state, package, association, etc.

Stereotype: A designator, textual and graphical, for a model element denoting its role within the software model and, optionally, implying additional properties associated with the model element.

Property: A property is a characteristic of all model elements of a given model element type. A property has a name and content. Each model element of a type has property content for each of the properties associated to its corresponding model element type. A property can be used to capture a non-functional requirement like a design decision, an implementation decision, or a code-related option. In the UML™ 1.3 specification, a property is called a tagged value.

Architectural issues: Statements that cover the best practices for transforming or implementing the model elements of a software system. The word "statements" refers to the domain model itself or to any technology or platform involved in its implementation.

Design decision: Implementation data or decisions that provide a valid answer for an architectural issue.

Software technology: Any significant software used to implement directly or indirectly a domain software model. The kind of software technology—free, commercial, in-house offering, or other—is immaterial. It is sufficient to note that collaborating or competing technologies have different implementations and different issues guiding their correct use.

Architectural layer: a portion of a software system representing the industry domain or a selected software technology or operating system platform used to implement the domain software model. Layering permits the developers of a system to group architecture issues per industry domain, technology, or platform so that changes made within one layer have little or no impact on the others.

BACKGROUND OF THE INVENTION

Developing software systems represents both great economic value and great cost. Software tools and development methodologies address these costs so as to increase the profits by reducing costs. Unfortunately, the costs often grow faster than the profits as systems grow large. The advent of software modeling represents one of the greatest opportunities to improve the profitable value of producing large software systems.

Industry effort has improved the level of detail and the ability to specify systems through models in recent years. These developments make the transformation of an idea into a software system more straightforward either because it is quicker or because it reduces the risk that mistakes and misunderstandings will cause waste. In the beginning, modeling consisted of little more than a visual representation corresponding exactly to programmatic elements. Several developments stand out: a standardized visual notation (the Object Management Group's (OMG) Unified Modeling Language™ or the UML™); a model-view paradigm in which a model element contains a comprehensive set of data about the programmatic elements and a set of view filters that emphasize important aspects of these elements; the increasing use of metadata or information about the information held on an element; and the increasing level of abstraction of the meaning of one element. Where in former times one model element represented one programmatic element, in an "analysis software model," one model element can represent or imply a whole set of collaborating programmatic objects for its implementation, often through several layers of an architecture.

At first, metadata about the model element referred to concrete programmatic architectural issues. Each new architectural issue required additional properties to record its properties that reflected valid implementation choice. Eventually, during the standardization efforts needed to create the UML™, a generalized and extendable mechanism, known as tagged value pairs, was created by which the toolmakers could add arbitrarily named data. Many modeling tools use this concept, including Rational Rose™, Together™ from TogetherSoft, Power Designer™ from Sybase and GD-Pro™ from Embarcadaro Corp. The early specifications of the UML™ recognized the usefulness of tagged value pairs for uses such as code generation. While typing of tagged values was specifically excluded from the UML™, some modeling tools, such as Sybase Power Designer™ have implemented such extensions.

Codagen Technologies Corp has developed the notion of external properties and external property groups. While the external properties are analogous to tagged values, the external property groups link these external properties to model elements. As with tagged values, the external properties are stored within the model of the host modeling tool. The addition of external property groups avoids the limitation that any external property/tagged value must be unique.

Many tools provide code generation capabilities. Many of these use tagged values or external properties to alter the semantics of code generation. While other code generation systems exist, those using tagged values fall into three categories.

First, macro or wizard type generators resolve parameterized source code with existing tagged values when the code generation is applied to the model element. This technique requires manual reapplying the code generation wizard if and when the tagged values of the model element change.

Second, some modeling tools provide a scripting language used to concatenate source code or to resolve parameterized source code with model elements and their associated tagged values as an alternative way to generate source code. This technique allows for refinement or correction of the software model, including tagged values to be reflected in subsequent automatic code generations. Unfortunately, the abstraction is quite low, meaning that in order to specify the model to sufficient detail for code generation, the model must contain many programmatic details and many hard coded properties. This is similar to programming within the model, making the model fragile in the face of change and requiring extensive technical programming expertise as well as UML™ and tool expertise.

Third, Codagen Gen-it™ Architect implements the effect of any property in code templates rather than in the modeling tool, these templates being called Gen-it™ Parameterized Architecture Blueprints™. During the code generation process, the generator contextually examines the model and tagged values to generate code.

Another type of tool generates code or other development artefacts in a post-processing step. They add software technology specific information to an extract of the software model. For example, Object/Relational mapping tools generate the glue code for marshalling model elements to and from a relational database. Object-relational mapping is the process of transforming between object and relational modeling approaches and between the systems that support these approaches. These tools extract information about the model element from the UML™ modeling tool. This is combined with user-entered information and information extracted from existing artefacts, like a database diagram, to create integrated object-relational mappings. Some of these tools record user responses, facilitating further refinements and evolutions.

Since the advent of platforms, also known as operating systems, software systems have been developed in layers. At the simplest and earliest level, this means dividing code specific to an operating system and to a particular domain. Present-day complex software applications, development software, middleware, and frameworks require layering for success. It is not uncommon for an application to have layers for database access, user interface, domain logic, and technologies such as Enterprise JavaBeans™ from Sun Microsystems. Development within one layer is mainly independent from development in another.

Software modeling addresses layering by designating a model element as belonging to one or another layer. The level of abstraction is limited by the fact that at least one model element must be present for each architectural layer of the software system.

The current UML™ tools have a very restricted view of tagged values. They treat tagged values as an integral part of the software model and so store them in proprietary repositories. From the point of view of the modeling tools, all tagged values are equal. There is no differentiation or management between those related to the architectural layer for one technology or another or for one platform or another. Partitioning is possible only by logical grouping of the domain, implying model elements at each relevant logical group. Partitioning is impossible by technological layer or by platform layer within any one model element or model element type.

SUMMARY OF THE INVENTION

Accordingly, an object of the present invention is to facilitate the appropriate design specification of a software model.

A further object of the present invention is to generically specify a software model so that portions of this model can be reused.

Another object of the present invention is to build a pool of software model specifications from which a designer can extract the relevant layers and properties to create new models rapidly and efficiently.

Another object of the present invention is to store, outside of a modeling or an Integrated Development Environment (IDE) tool, all or a subset of the properties associated with architecture issues of a model element using property definitions. A unified view of the property is preferably presented when updates or changes are necessary.

Yet another object of the present invention is to define the software implementation of a domain model outside of the modeling or IDE tool and store properties associated with a given technology or platform in one or more data-stores.

The system of the present invention manages the architectural issues and properties related to the architectural layers within the context of software development. It provides mechanisms to define the architectural layers and the additional information required by them. It advises the software developer when the system does not conform to this architecture and it enforces the compliance.

According to a first broad aspect of the present invention, there is provided a method for specifying a software model. The method comprises specifying at least one architectural layer for a software system; specifying at least one property and relating each the at least one property to one of the at least one architectural layer and to at least one model element type to which the at least one property is attached; and automatically providing assistance for specifying property contents of the at least one property using an architecture layer corresponding to the at least one property for each one of a plurality of model elements to be defined as part of a software model of the software system.

According to another broad aspect of the present invention, there is provided a system for specifying a software model. The system comprises: a layer specifier for specifying at least one architectural layer for a software system; a property specifier and relater for specifying at least one property and relating each the at least one property to one of the at least one architectural layer and to at least one model element type to which the at least one property is attached; and an assistance provider for automatically providing assistance for specifying property contents of the at least one property using a layer corresponding to the at least one property for each one of a plurality of model elements to be defined as part of a software model of the application.

According to another broad aspect of the present invention, it is directed toward a system and method for describing properties based on architectural layers within a software model. More particularly, the present invention is directed to a system and method in which the architectural layer, which assigns the property on model elements of the software model, assists and affects the presentation, the creation, the revision and the storage of the property content. This allows the creation of a derivative software model and derivative software system. It also maintains coherent a system model of interrelated software system by changing the physical storage containing properties contents associated with model element of a specific non-functional requirement like a target technology or platform. This structured description eases the redeployment of an application from one technology or platform to another and the derivation of one software model from another one.

BRIEF DESCRIPTION OF THE DRAWINGS

These and other features, aspects, and advantages of the present invention will become better understood with regard to the following description and accompanying drawings wherein:

FIGS. 24a to 24i are, when taken in juxtaposition, a XML algorithm for specifying how the architectural definitions are stored in a data store.

DETAILED DESCRIPTION OF THE PREFERRED EMBODIMENT

The preferred embodiment of the present invention assists the developer by displaying the associated architectural layer anytime he views the properties for a model element.

Figure 1:
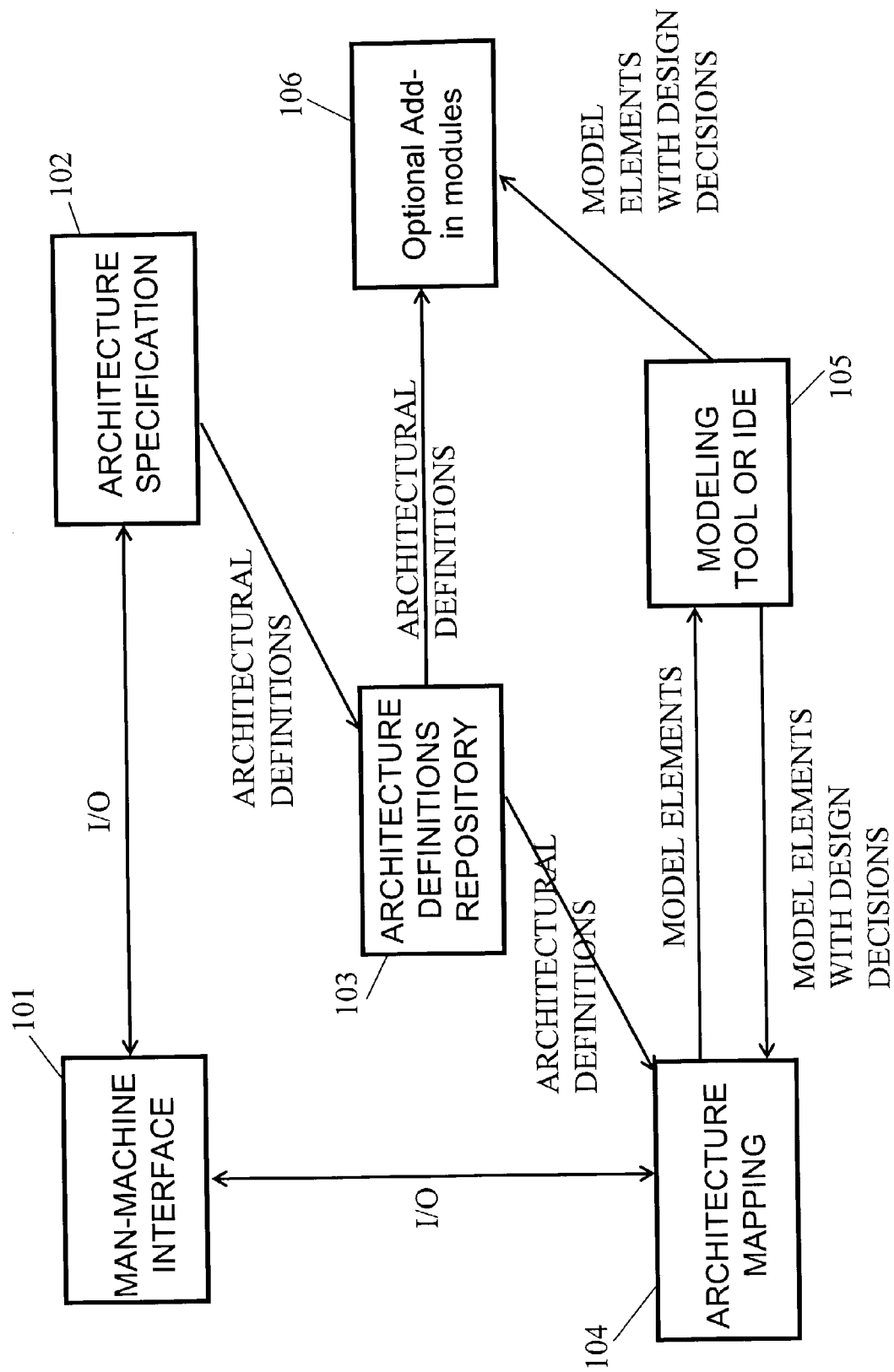
FIG. 1 is a block diagram of the preferred system for managing architectural layers and their contents.

FIG. 1 presents the preferred block diagram of the invention. The man-machine interface 101 interfaces with the user. It provides the critical function of presenting data to and accepting input from the user. The details of the interaction depend on the needs and tastes of the actual implementation. The architecture specification 102 permits the user to specify the architecture of a software model. The architectural definitions are stored in a data store 103 called the Architecture Definition Repository. An XML algorithm specifying how the architectural definitions are stored in a data store is detailed in FIGS. 24a to 24i. FIGS. 24a to 24i combined form the whole algorithm. FIGS. 2–6 present a set of screens describing an example of a user interface for interacting with the architecture specification subsystem.

A series of activities is required to define an architecture specification:

Define the architectural layers 110 involved in the implementation of a software model. Two examples of architectural layers might be Business and Database (see FIG. 2).

For each layer, define the architectural issues 120 that need to be addressed in order to get the best implementation of a technology associated with that layer. Two examples of issues for a Database layer might be Persistence and Concurrency (see FIG. 3).

For each architectural issue, define one or more properties 130 that will assist the developer to address the issue. Two examples of properties for a Persistence issue might be the Boolean isPersistent, to indicate whether a class/attribute is persistent, and the Boolean isKey, to indicate whether an attribute is a key (see FIG. 4). Note that properties can be dependent on each other. For example, the properties isKey and isPersistent are dependent in that if isKey is true for an attribute, then isPersistent must be true. The property isKey is displayed and managed only when isPersistent is indicated to be true by the developer. These dependencies could be at a plurality of levels. For example, a third property could be dependent on the property isKey being true.

Assign each property to one or more model element types 140 in the software model (package, class, attribute, operation, and so forth) in order to get the value pair of property and model element. For example, isPersistent might be associated with both class and attribute, and isKey might be associated with attribute (see FIG. 5).

For each value pair of property and model element type, define a default value. For example isKey and isPersistent might be defined as a Boolean with the default value "False" (see FIGS. 4 and 5).

Eventually, define a default value for every stereotype relevant for each pair of property and model element. For example, the default value of the isPersistent property becomes "True" for classes with stereotype "EntityBean" (see FIG. 6).

Note that developers can use this preferred embodiment to copy selected portions of the contents of architectural definitions. Indeed, the module provides tools for copying/deleting an architectural layer, an issue, or a property definition within one architecture specification or between different architecture specifications. It also provides tools for moving a property from one issue to another or an issue from one architectural layer to another.

The Architecture Mapping Module 104 allows the developer to map the architectural definitions to the software model. This consists of associating the architectural definitions with the software model and in validating the default value associated with each paired property and model element or in providing a new value. The architecture mapping subsystem intimately interacts with a running instance of a modeling tool or IDE 105. The modeling tool 105 is a commercially available modeling tool or integrated development environment. It provides access to its model elements and the control events such as selecting model elements or activating menu items. It shares the model elements with the architecture mapping module.

Figure 7:
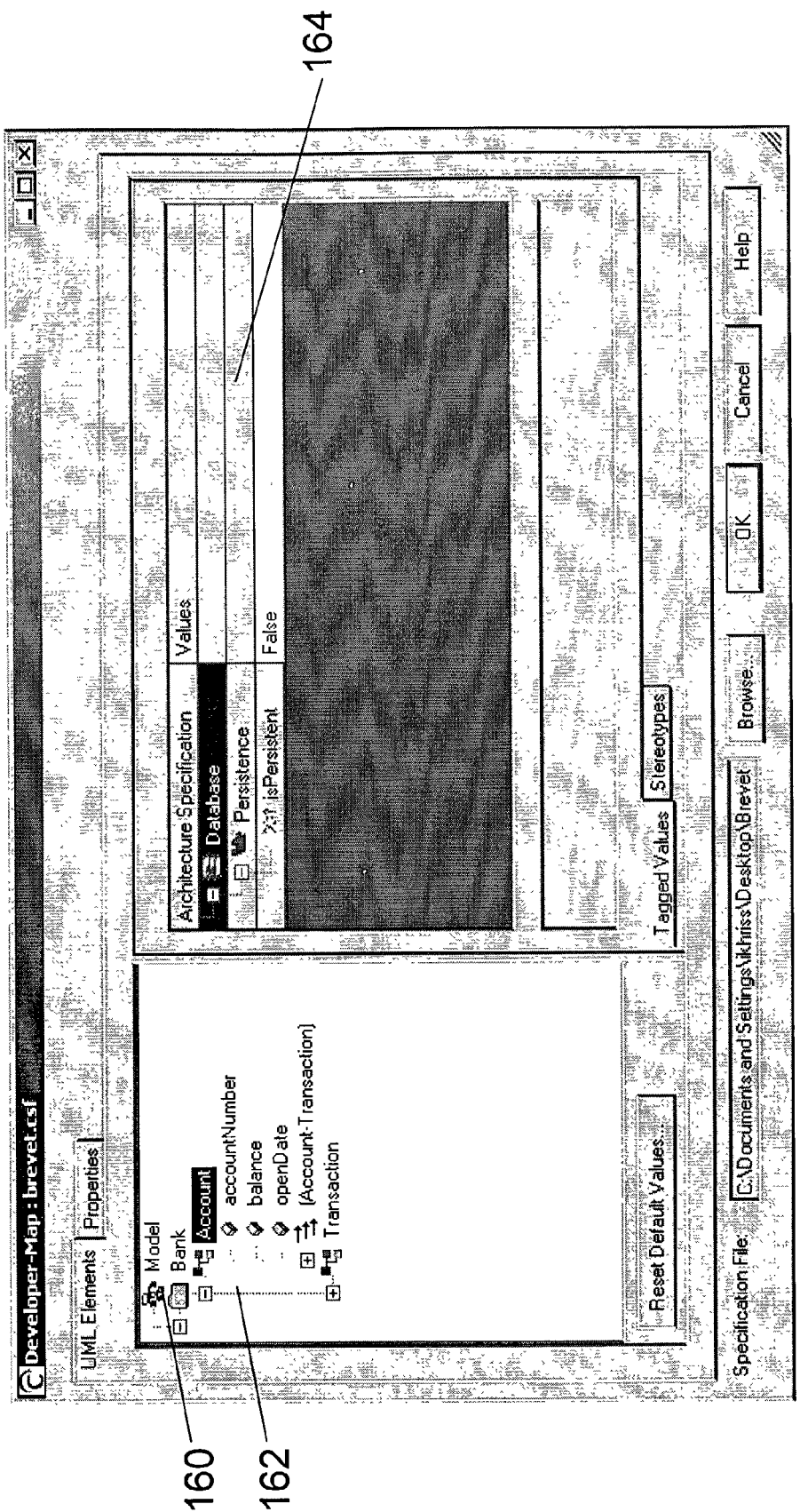
FIG. 7 shows a sample of an interface for viewing property contents for model elements, it shows the property contents for the Account class, which is shown to only include the isPersistent property.

FIGS. 7 to 10 show a set of screens describing an example of a user interface for interacting with the architecture mapping module 104. When a developer selects a model element and calls the module, the architecture mapping module 104 permits the developer to view the properties and their contents. FIG. 7 shows an example of properties 164 and their contents for a model element Account. Note that the module displays property content only for properties that are assigned to the model element type (in this case, classes).

Figure 8:
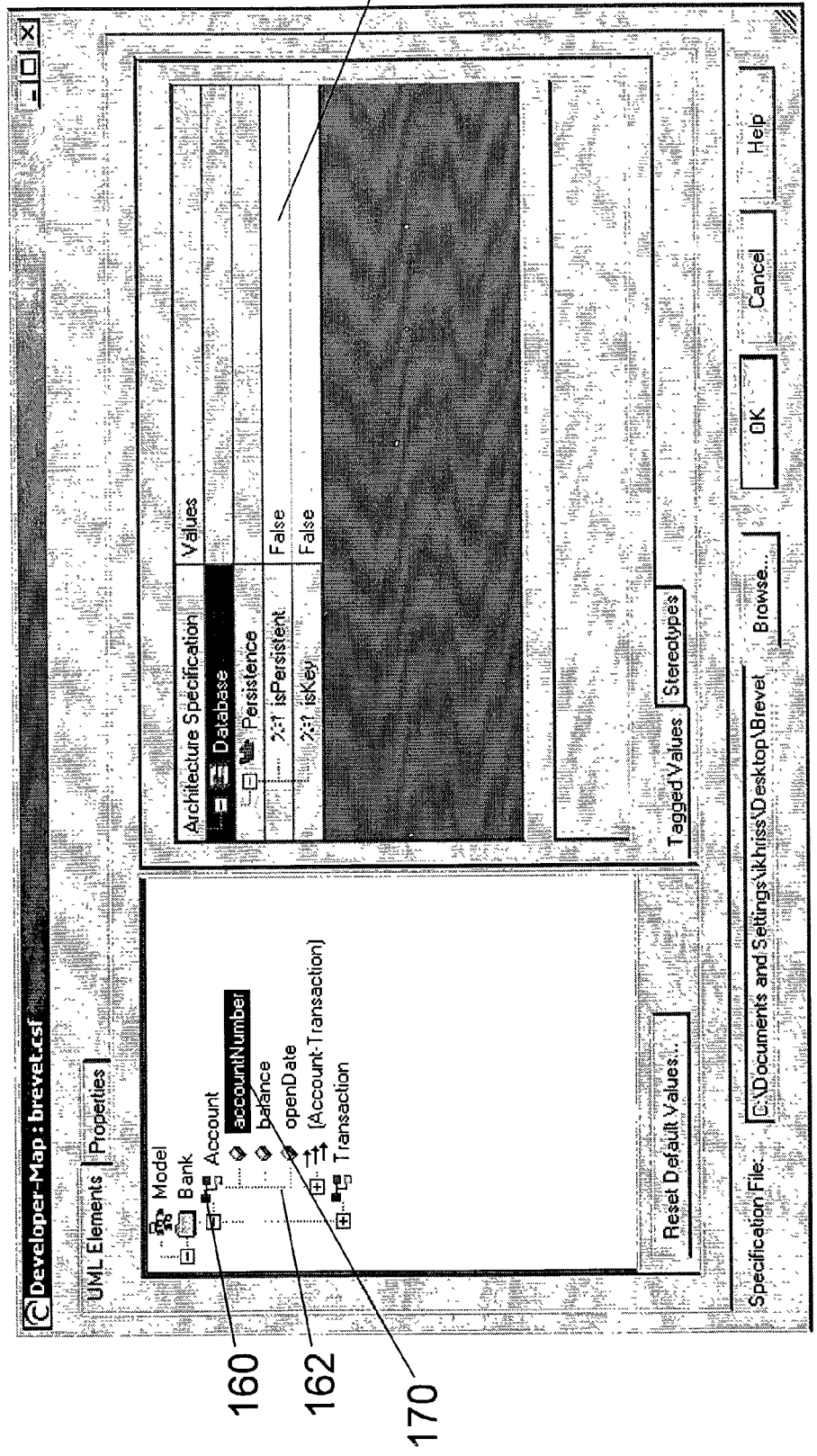
FIG. 8 shows a sample of an interface for viewing property contents for model elements, it shows the property contents for the accountNumber attribute, both isPersistent and isKey are shown.

FIG. 8 shows properties 172 and their contents for the model element accountNumber 170, which is an attribute of the Account class 160. The two properties are displayed since isKey is assigned to attributes, and isPersistent is assigned to both classes and attributes. In addition to viewing, this embodiment allows the developer to edit and update the existing property contents, specify initial contents for undefined ones and remove the contents so that the contents become unspecified. For example, the default value 192 for the property isKey is "False." The developer can validate this default value for the attribute balance 190 (see FIG. 9) while entering a new value for the attribute accountNumber 170 (e.g., "True" 202, see FIG. 10). The property contents of model elements are saved as tagged values with the tools provided by a modeling tool or IDE. Optional add-in modules 106 include, for example, code generation, model transformation, model validation, and model reporting. An add-in module providing code generation will allow the generation of source code from a domain model. An add-in module providing model transformation will allow the manipulation of model elements in order to modify their contents, for instance modifying the type of a class attribute; suppressing a model element; creating new model elements such as creating, in the model, a new attribute of a given class.

An add-in module providing model validation will allow the validation of the model against a set of rules defined by the developer, for instance, validating if all classes have at least one attribute. An add-in module providing model reporting will allow the generation of a report containing some pertinent information about the contents of the model. The Gen-it™ Generator by Codagen Technologies Corp. is an example of system offering these add-ins. These add-in modules 106 extract, from a modeling tool or IDE, property contents of model elements and, from data stores, architectural definitions in order to generate code, validate a model, or generate a report about the model.

This embodiment allows one or more pairs of software model and architectural definitions to access other modules at once, depending on the configuration of the data stores. In fact, by reconfiguring the data stores, the developer might use several architecture specifications for the same software model or apply an architecture specification to different software models. Moreover, by organizing the properties by architectural layers and issues, the present embodiment allows the optional add-in modules to filter property contents during the extraction and, hence, have more control in performing their activities.

A—Use Case of the Present Invention

The Model Driven Architecture (MDA) initiative of the Object Management Group (OMG) seeks to create a specification that will both protect the UML™ investments made when the domain layer of an application is modeled and provide adequate agility when implementation changes are required. If an enterprise's domain layer is captured inside a technology-independent UML™ model (a so-called "platform independent model" or PIM), then the model serves a function that is similar to that of a refined analysis model because it represents the logical view in which the composition and behaviour of all components (but not their implementation) are fully specified.

Since the PIM, by definition, does not contain technology details, it is contemplated that the PIM will be mapped to one or more platform-specific models (PSMs). The PSM, which acts as a refined physical model, will represent the source code or its UML™ representation. There will be as many PSMs as there are different implementations of a given PIM.

The MDA approach offers a number of benefits: Improved productivity for architects and programmers; Lower cost of application development and management; Enhanced portability and interoperability; and Business models and technologies that evolve at their own pace.

In order to benefit from the advantages of MDA, a PIM has to be mapped to one or more PSMs. Currently, there is a gap between the PIM and the PSM. The current integration of UML™ modeling tools with integrated development environments (IDEs) does not fulfill that need. In order to close the remaining gap, developers need tools that make it possible to define, view, evolve, enforce, and document an application's architecture specification and its architecture implementation.

Figure 12:
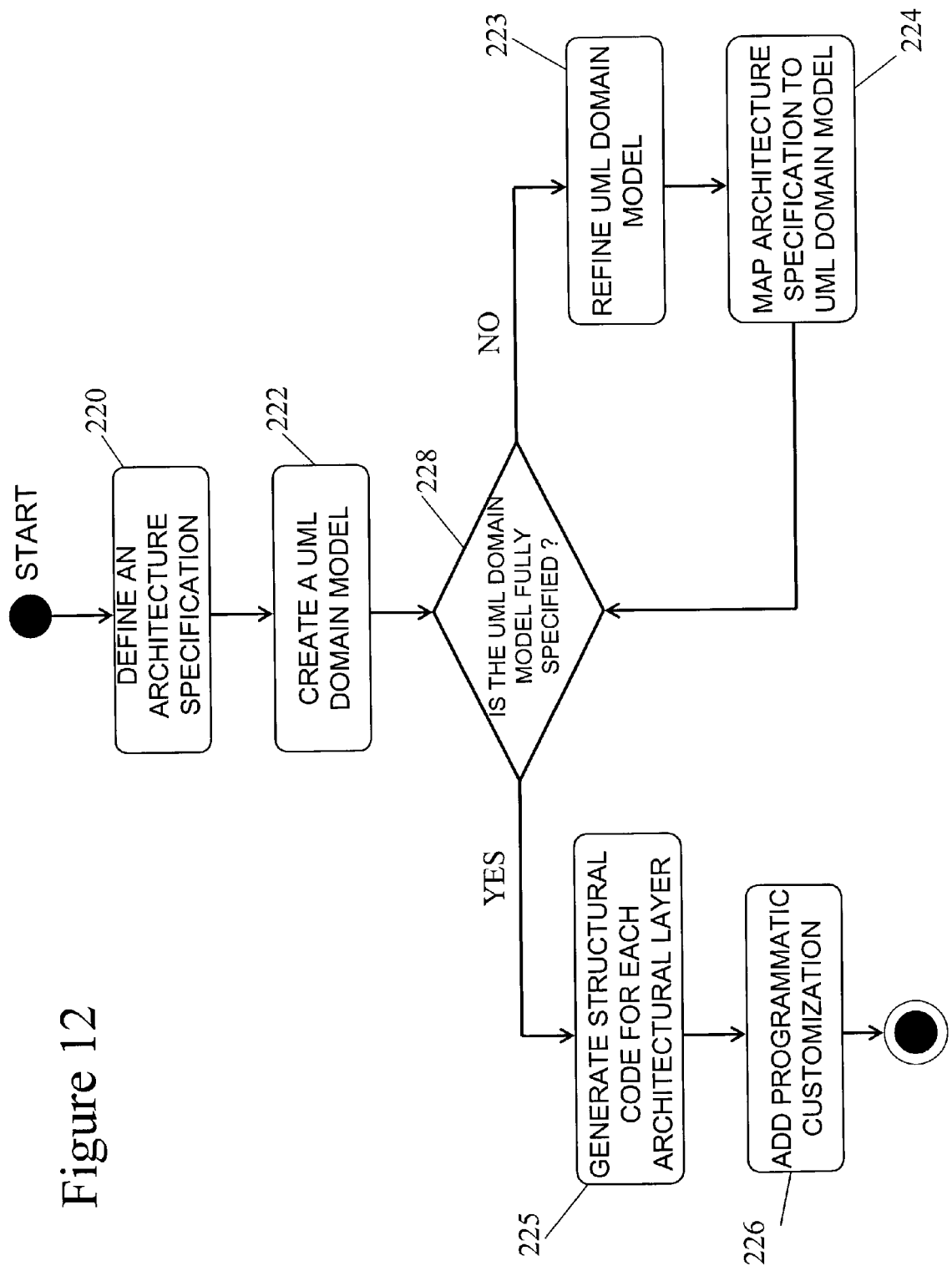
FIG. 12 shows the activities required to build the first instance of a system using one domain model implemented on one set of architecture layers.
Figure 18:
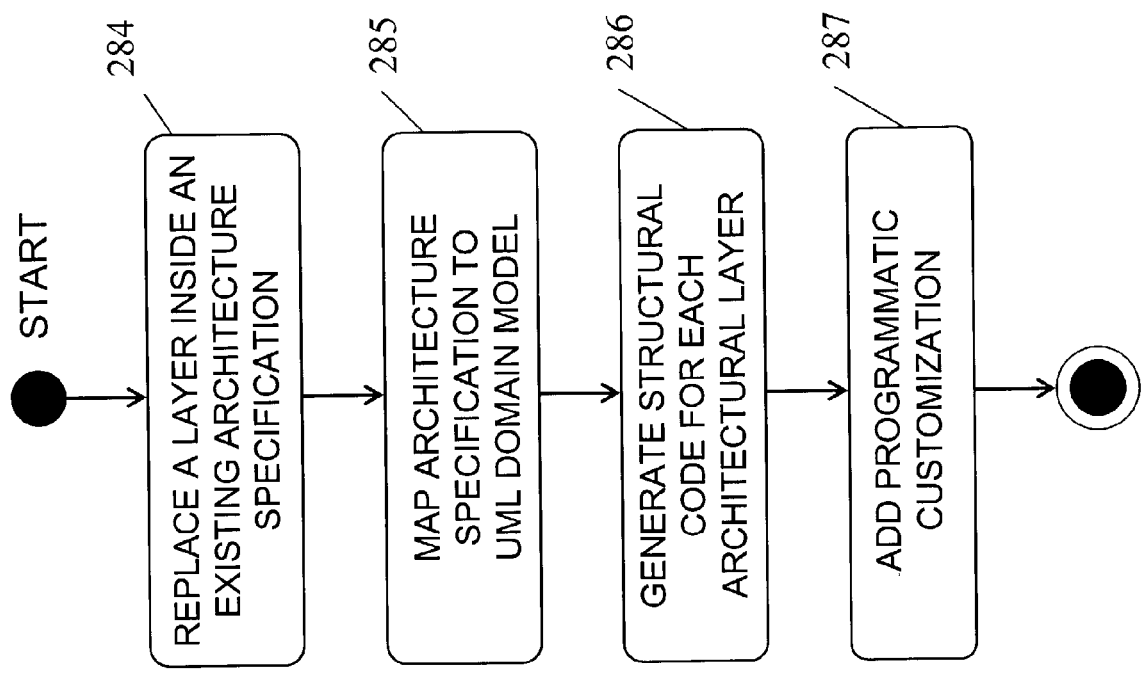
FIG. 18 shows the activities required to redeploy a domain model onto another set of architecture layers, it uses the domain model with multiple technology layers.

The present invention fulfills that need by providing a method for transforming a PIM into a set of PSMs wherein every PSM targets a set of technologies. Indeed, the flowcharts of FIGS. 12 and 18 describe different uses and reuses of the invention. FIG. 12 illustrates all the activities required to generate source code (playing the role of a PSM) from a domain model (playing the role of a PIM) by the application of an architecture specification. FIG. 18 illustrates the activities required to exchange one or more architecture layers with one another and, in effect, generate source code targeting a different platform from the same domain model.

FIG. 12 shows only the high-level activities. Other figures detail the activities carried out within the high-level activities.

Figure 13:
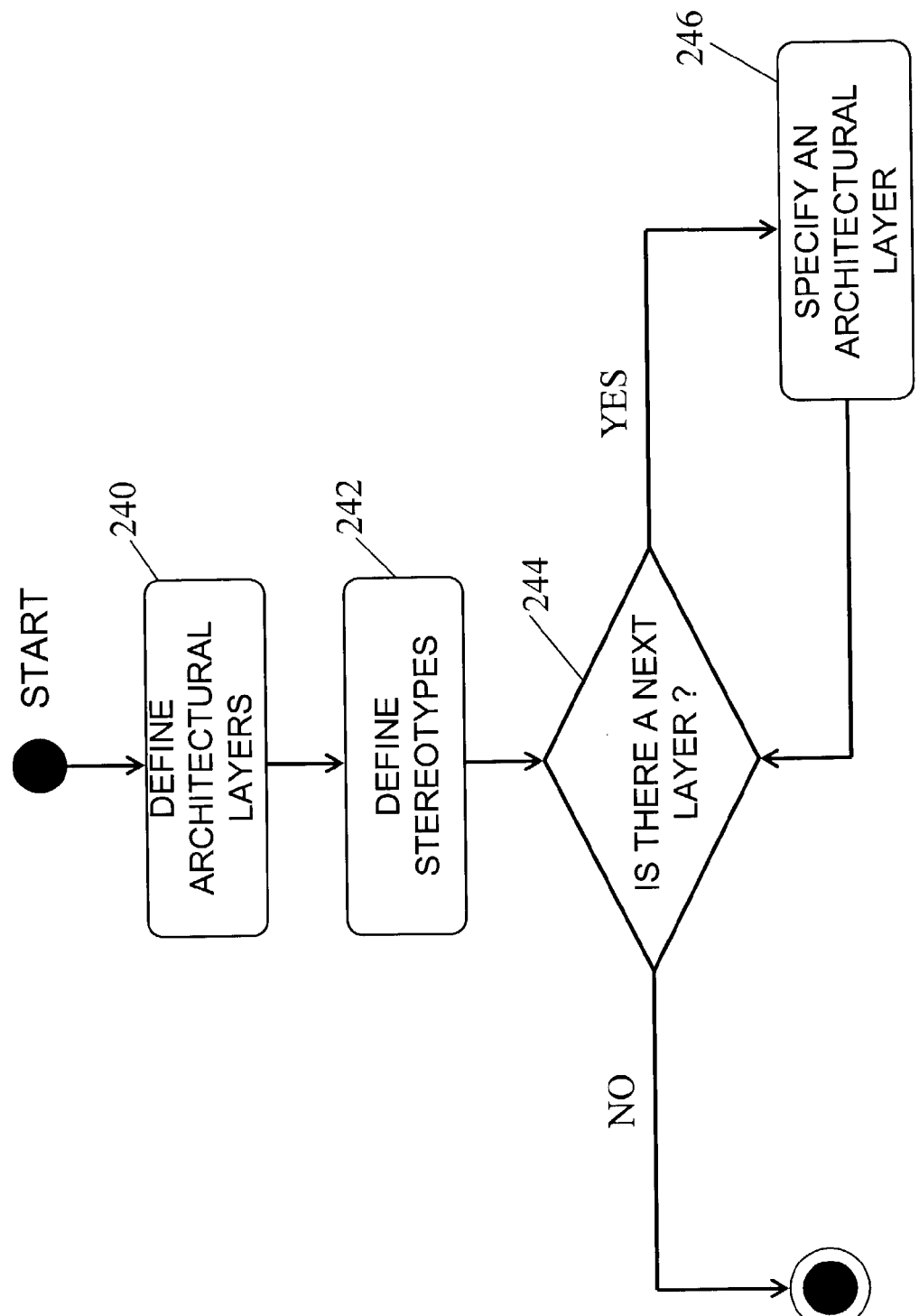
FIG. 13 shows the activities required to define the architectural specification of a system.

At step 220, the developer defines the structure of the architecture. This activity breaks the system into architectural layers, defines the valid stereotypes for each element type, and specifies the issues and properties related to these issues. This step defines a domain-independent architecture so the specification is not related to any domain model or rendered system in particular. Rather, the specifications can be used and reused for any system having the same structure. FIG. 13 illustrates the sub-activities of step 220.

Figure 2:
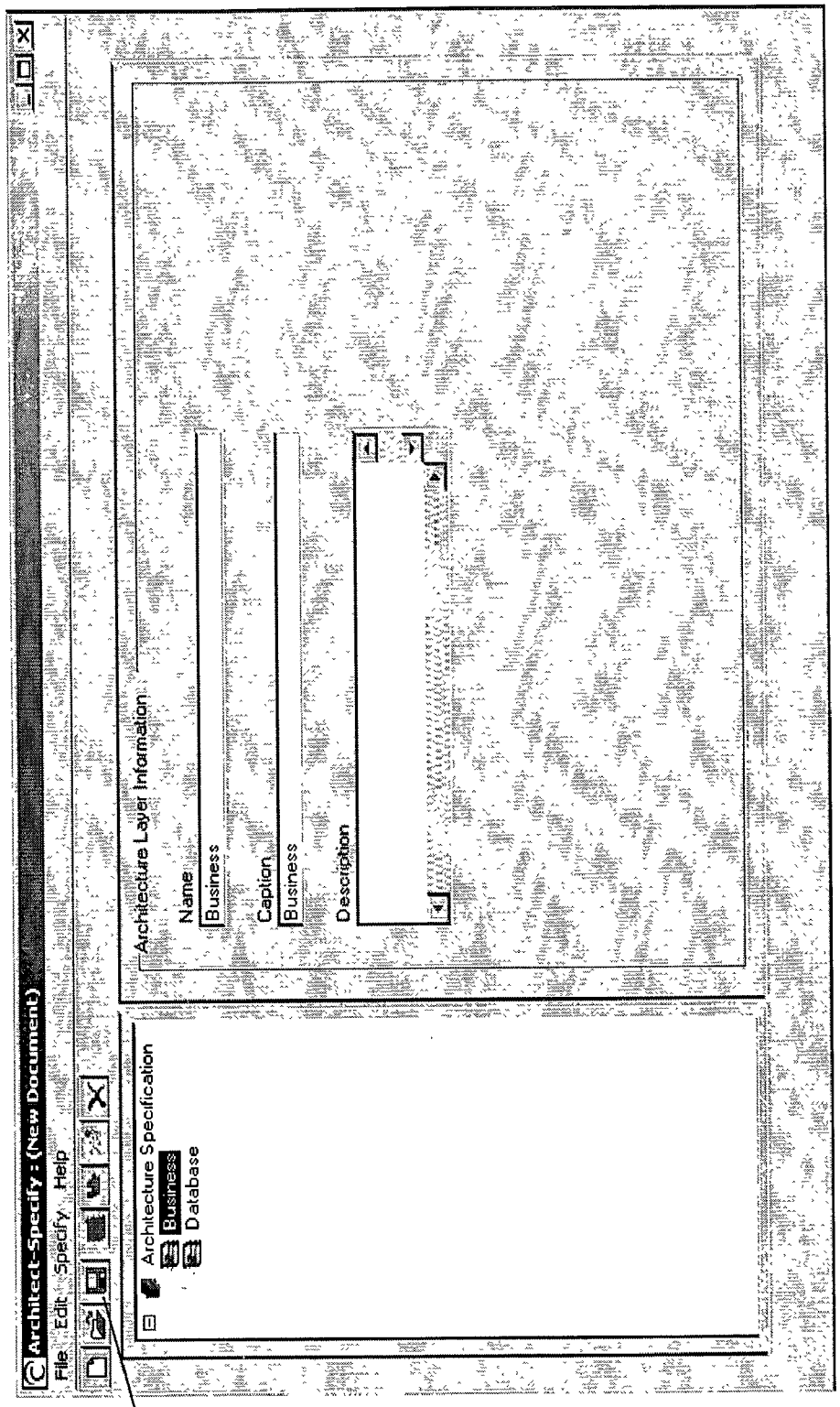
FIG. 2 shows a sample of an interface for managing architectural layers.

During step 240, the developer decomposes the architecture into layers. The motivation for this decomposition tends to revolve around 1) the expectation of different rates of change within a system; 2) the expectation of reuse of parts of a system without other parts; or 3) the separation of concerns of different developer teams. For example, separating a technology such as a database from the rest of the system would simplify the replacement of that database by a competitor, thus reducing vendor lock-in. It would also facilitate upgrading from one version to another. FIG. 2 provides a sample implementation of the management of architectural layers.

Figure 11:
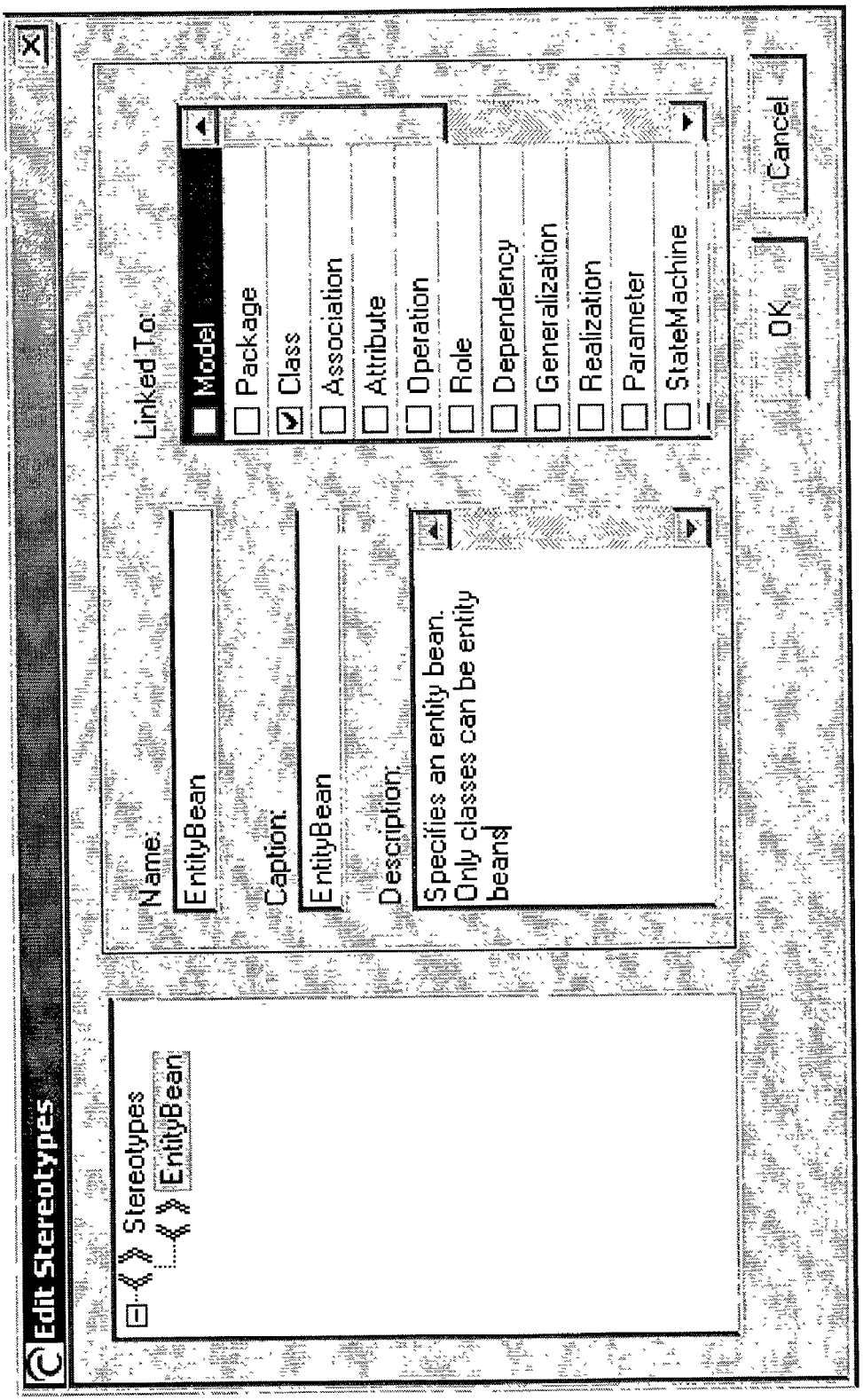
FIG. 11 shows a sample of an interface for managing stereotypes.

During step 242, the developer identifies the stereotypes within a system. The stereotypes specify the role and usage of a model element. Along with specifying the name and a description, the stereotype is associated with the model element for which it makes sense. An example of a UML™0 element is a package, a class, an operation, an attribute, a state, an activity, or any kind of relationship among UML™ elements of the same type or different types. An example of a relationship is an inheritance, an association, an aggregation, a dependency, or a transition. FIG. 11 provides a sample implementation of the management of stereotypes.

Figure 14:
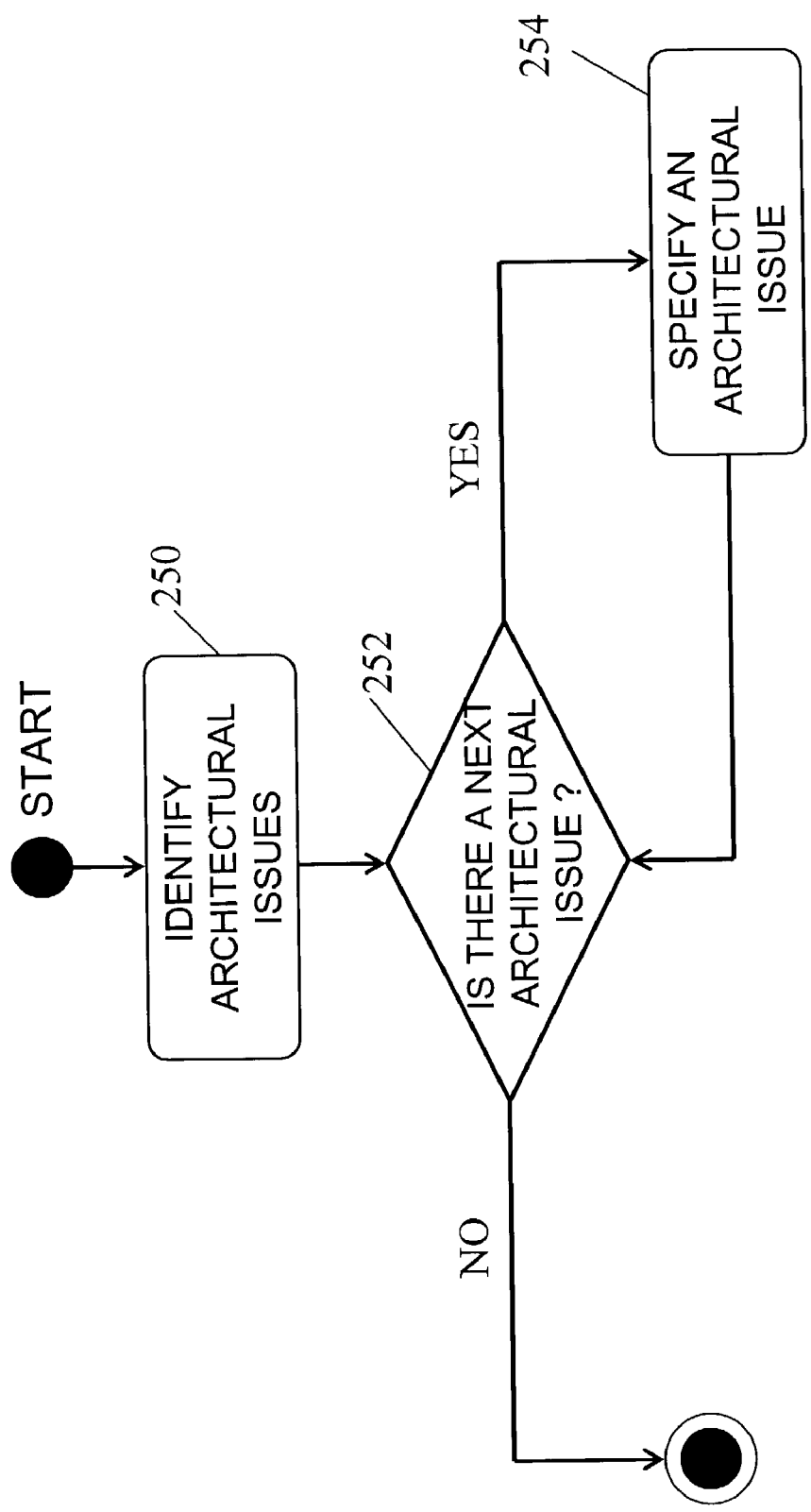
FIG. 14 shows the activities required to define an architectural layer.

At step 246, the developer specifies each architectural layer identified by the step 240. Step 246 comprises several sub-activities, which are described in FIG. 14. These sub-activities are repeated for each architectural layer 244.

Figure 3:
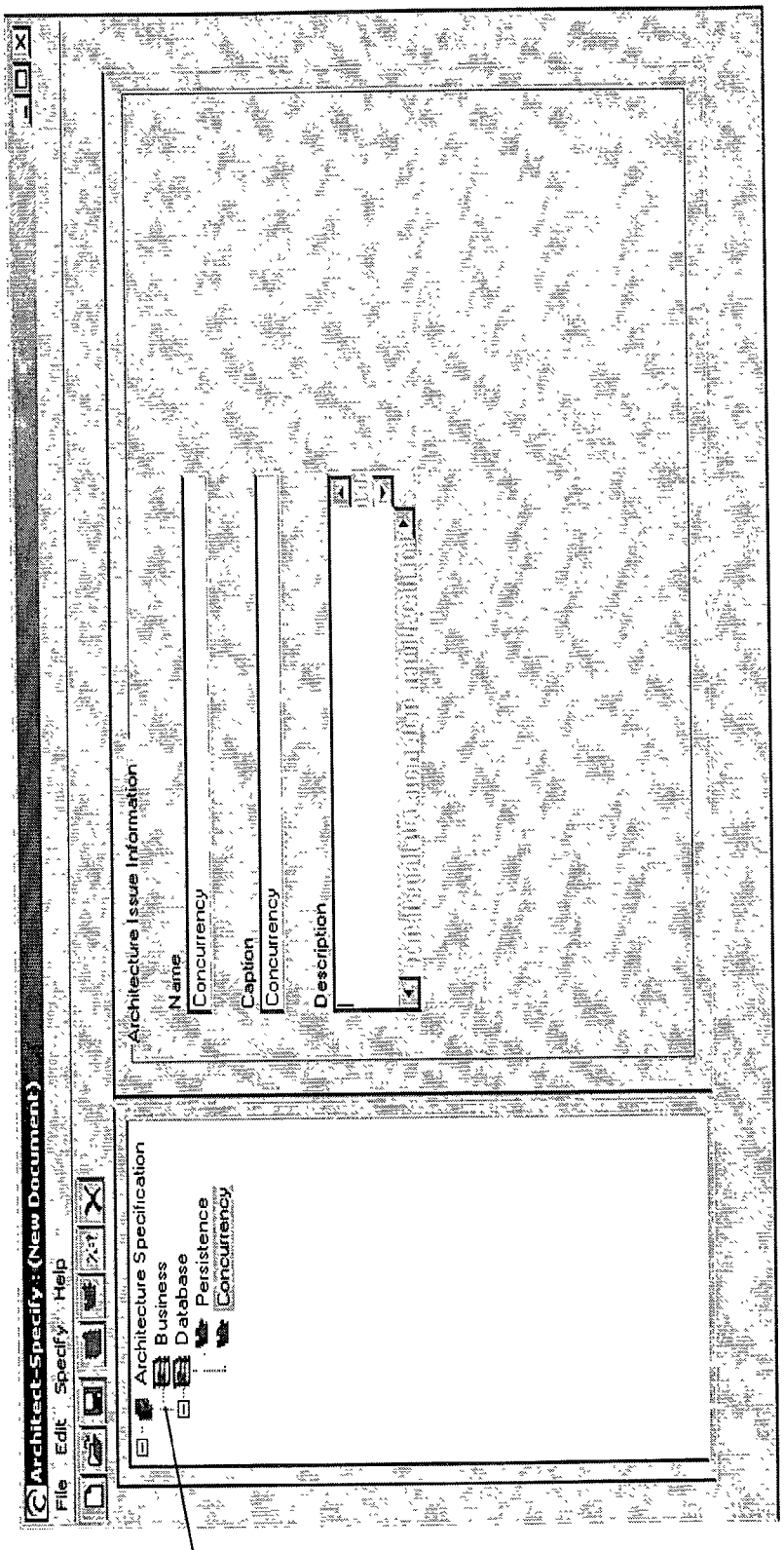
FIG. 3 shows a sample of an interface for managing issues of an architectural layer.

During step 250, the developer specifies the architectural issues of an architectural layer. FIG. 3 shows a sample implementation of the management of architectural issues of a layer.

Figure 15:
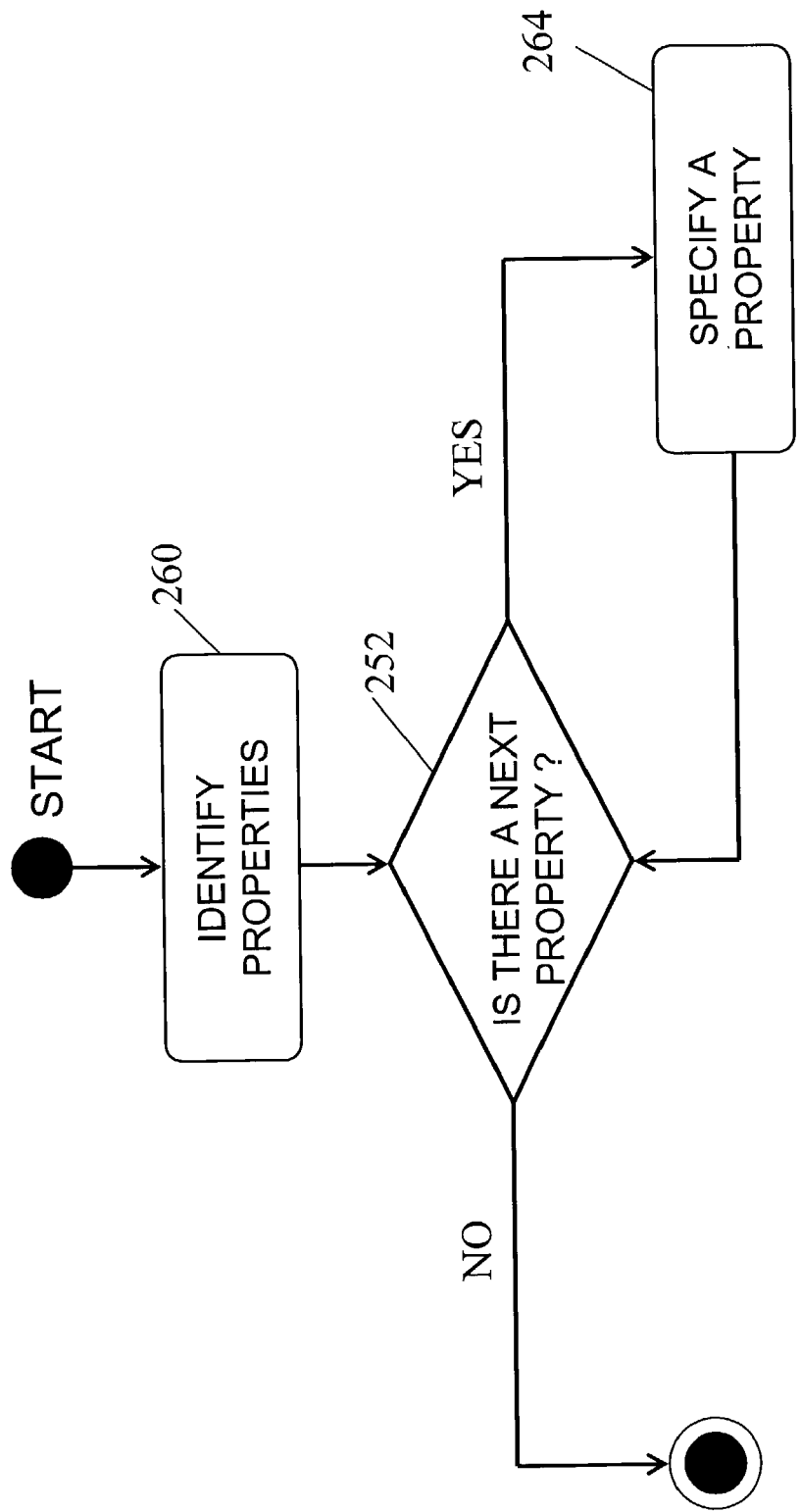
FIG. 15 shows the activities required to specify one architectural issue.

During step 254, the developer describes an issue. Activity 254 comprises several sub-activities, which are described in FIG. 15. These sub-activities are repeated for each architectural issue 252.

Figure 4:
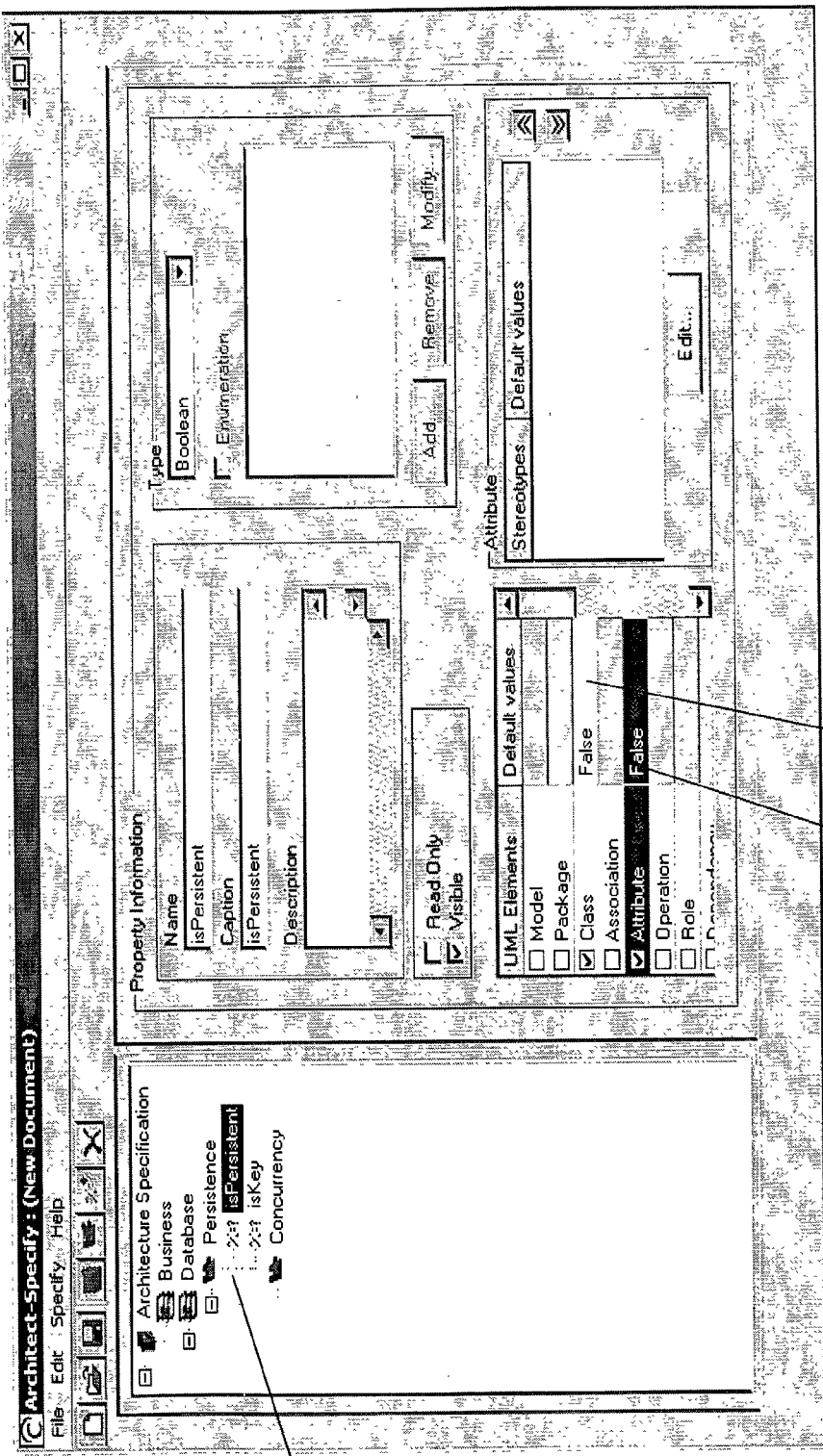
FIG. 4 shows a sample of an interface for managing properties on an architectural issue, it shows the definition of the isPersistent property, which is shown to be a Boolean property assigned to classes and attributes with default value "false;"
Figure 5:
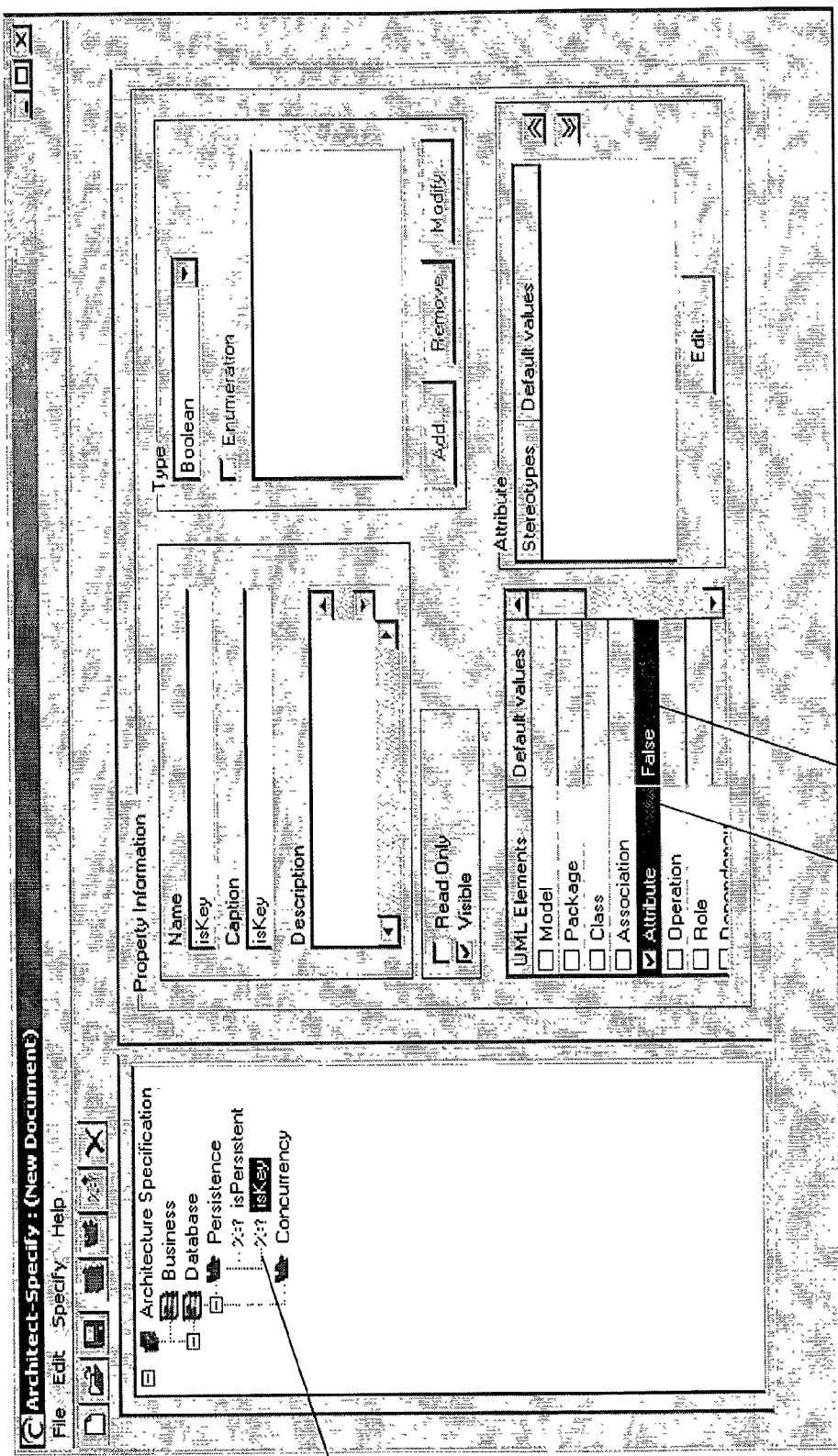
FIG. 5 shows a sample of an interface for creating properties of an architectural issue, it shows the definition of the isKey property, which is shown to be a Boolean property assigned to attributes with the default value "false;"

At step 260, the developer specifies the properties of an architectural issue. The properties are defined to maximize the richness of the model in view of the possible implementations. Since the objective is to generate code, the properties specify choices in the context of the actual application architecture, where the UML™ is too vague or too general. Therefore, each property choice has a direct effect on the implementation of the application. The effect is applicable to the best practices for implementing design patterns, the use of a specific technology, or a platform. FIG. 4 shows a sample implementation of the management of properties of an issue.

Figure 6:
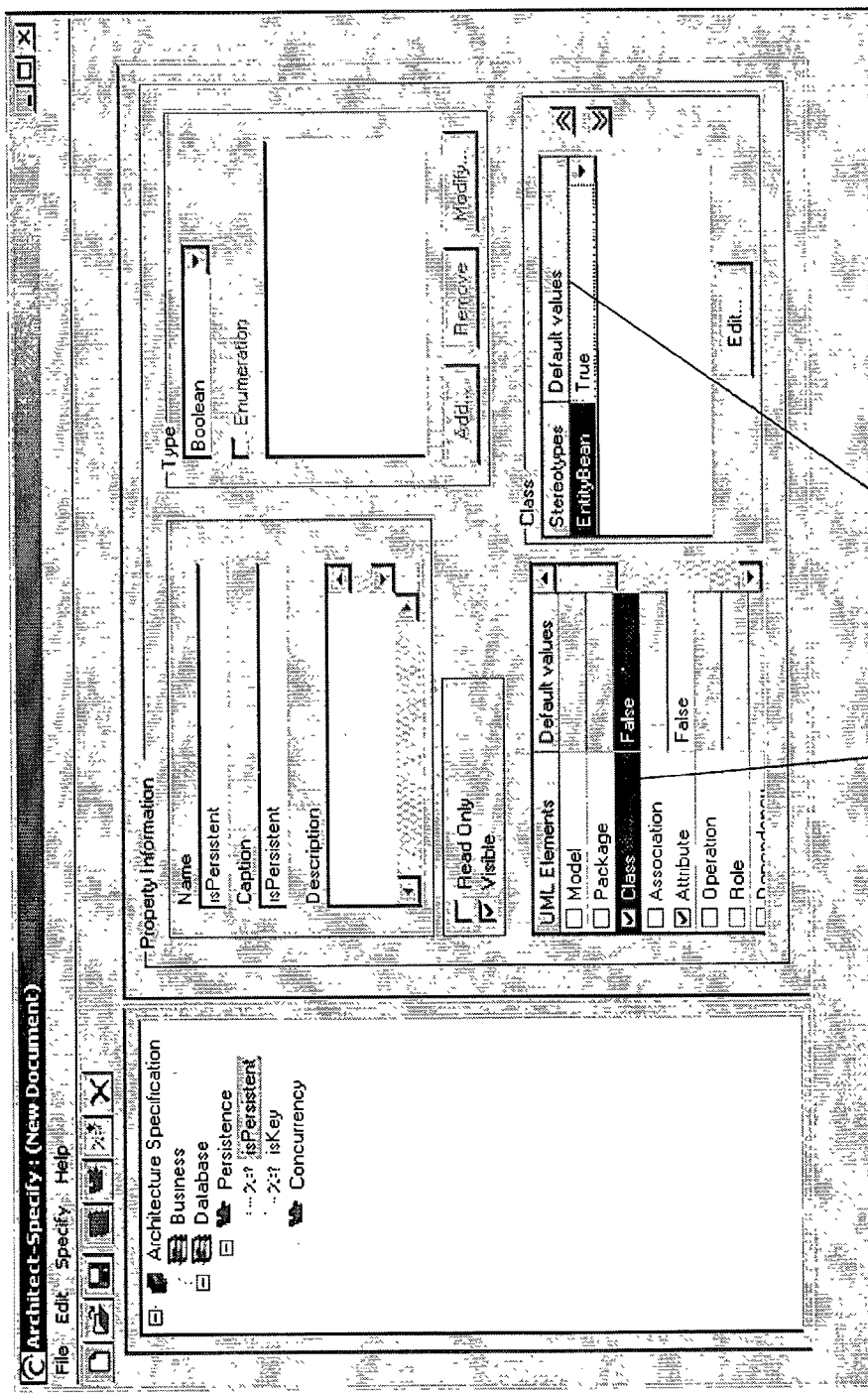
FIG. 6 shows a sample of an interface for managing default values of properties for different stereotypes, "True" is shown to be the default value of the property isPersistent for classes with stereotype "EntityBean;"
Figure 16:
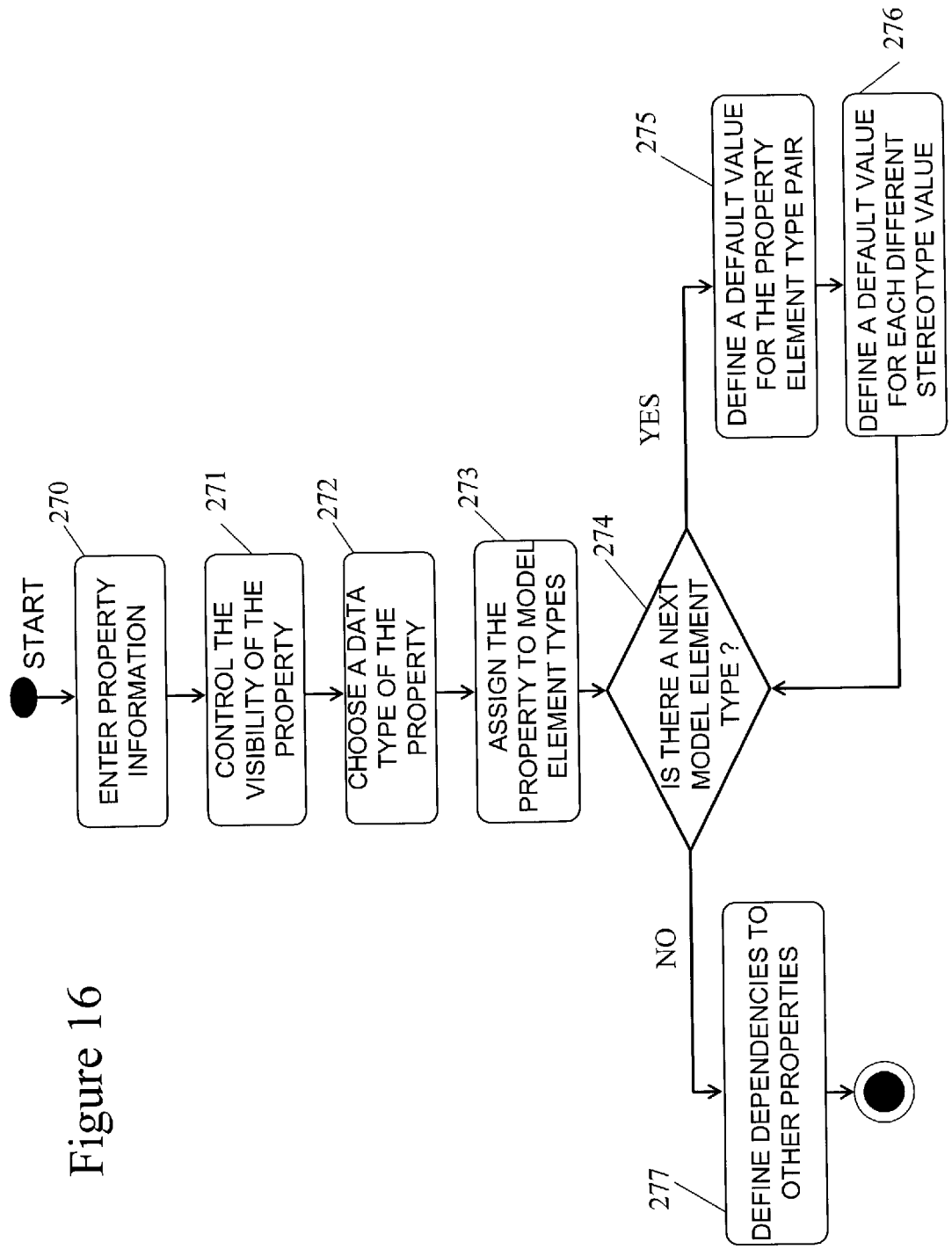
FIG. 16 shows the activities required to specify a property.

At step 264, the developer describes a property. Step 264 comprises several sub-activities, which are described in FIG. 16. These sub-activities are repeated for each property 262. FIG. 6 shows a sample implementation for creating a new property.

At step 270, the developer enters information on the property such as a name, a caption, and a description about the purpose of the property.

At step 271, the developer controls the visibility of the property. A property can be controlled whether or not developers can view and/or modify the current property.

At step 272, the developer constrains the property to be of a specific type. Examples of this type include but are not limited to: Boolean (True or False), String (any string of characters), Enumeration (a set of legal values or responses such as Vanilla, Chocolate or Strawberry,) or integer (any integer number).

At step 273, the developer specifies the model element types to which the property applies. Since model elements represent concepts as varied as logical structure, internal states, behaviour, and logical organization, it is rare that a specific design decision can be applied to all types of model elements.

At step 275, the developer defines a default value for a pair of property/model element type.

At step 276, the developer specifies the defaults for the property for each stereotype associated with a model element type. Activities 275 and 276 are repeated for each different model element type associated with the property 274.

At step 277, the dependencies of the current property being described with other properties are defined. Properties can be dependent on each other. For example, the properties isKey and isPersistent are dependent in that if isKey is true for an attribute, then isPersistent must be true. The property isKey is displayed and managed only when isPersistent is indicated to be true by the developer. These dependencies could be at a plurality of levels, for example, a third property could be dependent on the property isKey being true. Other properties could be dependent on isPersistent being false, etc. The developer must specify these dependencies in order for the interface to be more user-friendly and to display only the appropriate choices to the developer. The properties can therefore be organized hierarchically to decrease the number of dependent property values that the designer must specify.

Referring back to FIG. 12, at step 222 and 223, the developer uses the UML™ tool to create and refine a UML™ model as is currently done in the art.

Figure 9:
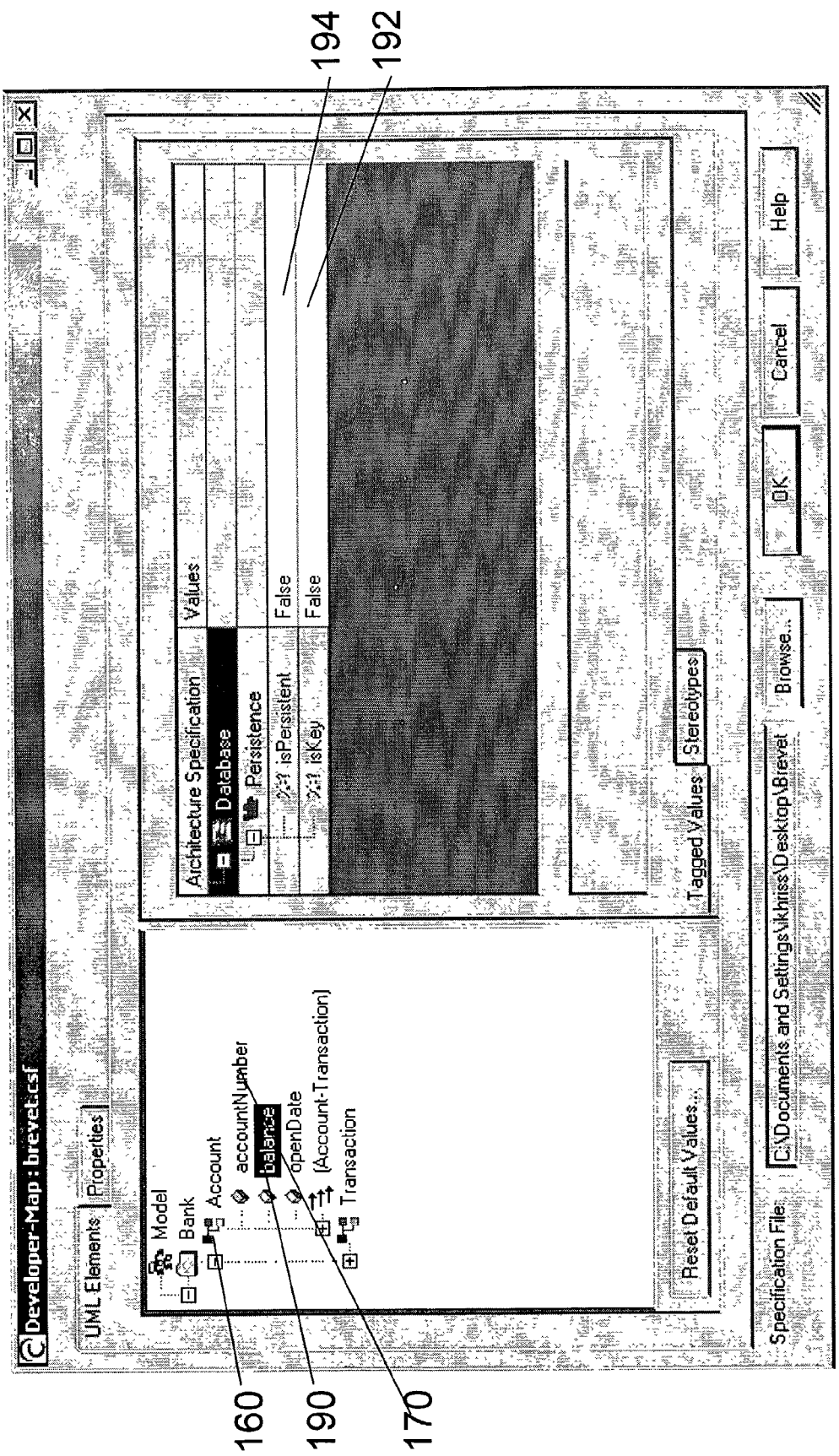
FIG. 9 shows a sample or interface for validating the default value of a property for a model element, in this case, the developer validates the default value of the property isKey for the attribute balance.
Figure 10:
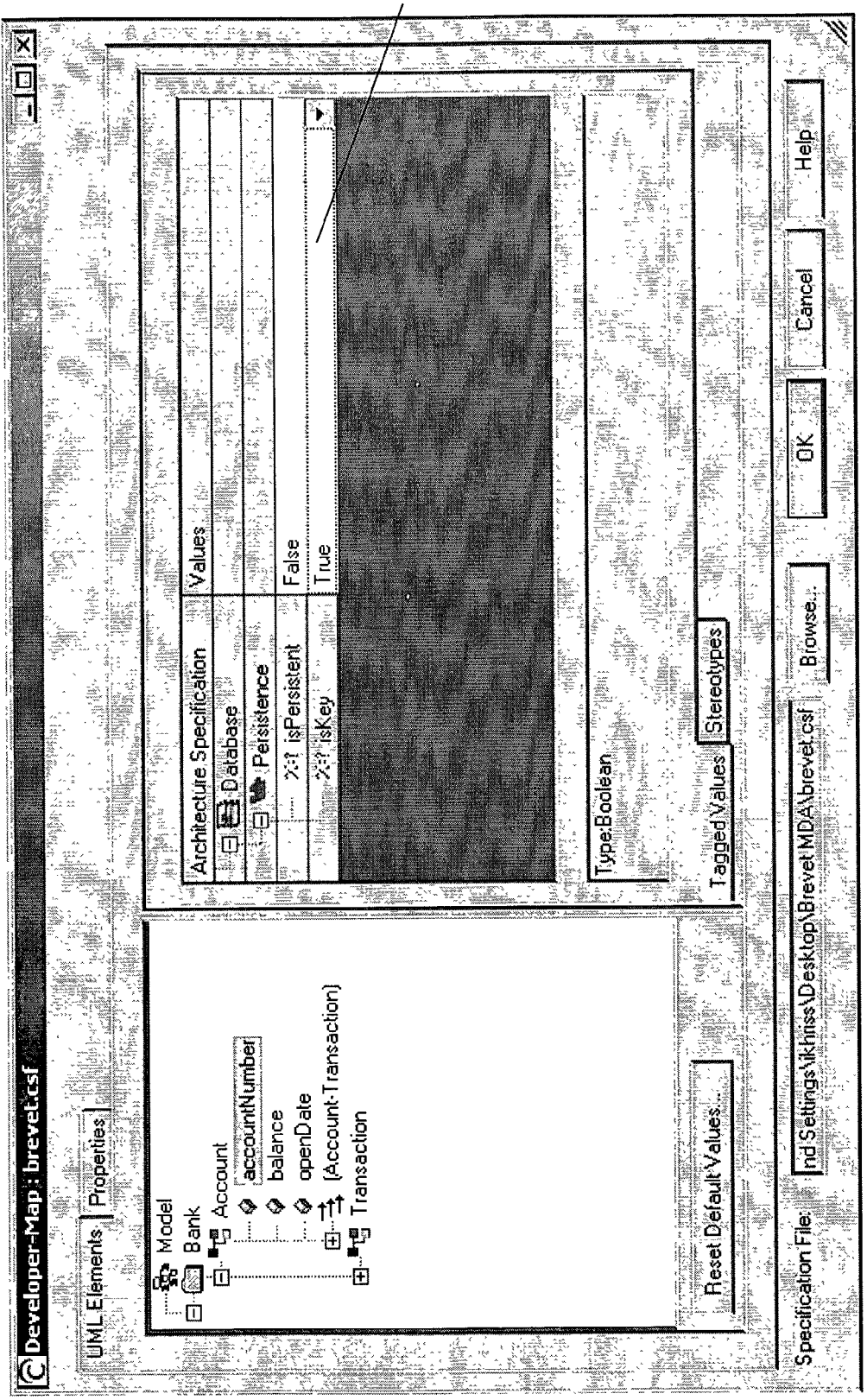
FIG. 10 shows a sample of an interface for changing the value of a property for a model element, the property isKey becomes "True" for the attribute balance.

At step 224, the developer applies the architecture specification to the UML™ model. This consists of associating the architecture with the UML™ model and validating the default value associated with each property and model element pair or providing a new value. FIGS. 9 and 10 give a sample implementation for performing this activity. Steps 223 and 224 are repeated until the instance is fully specified in 228.

Figure 17:
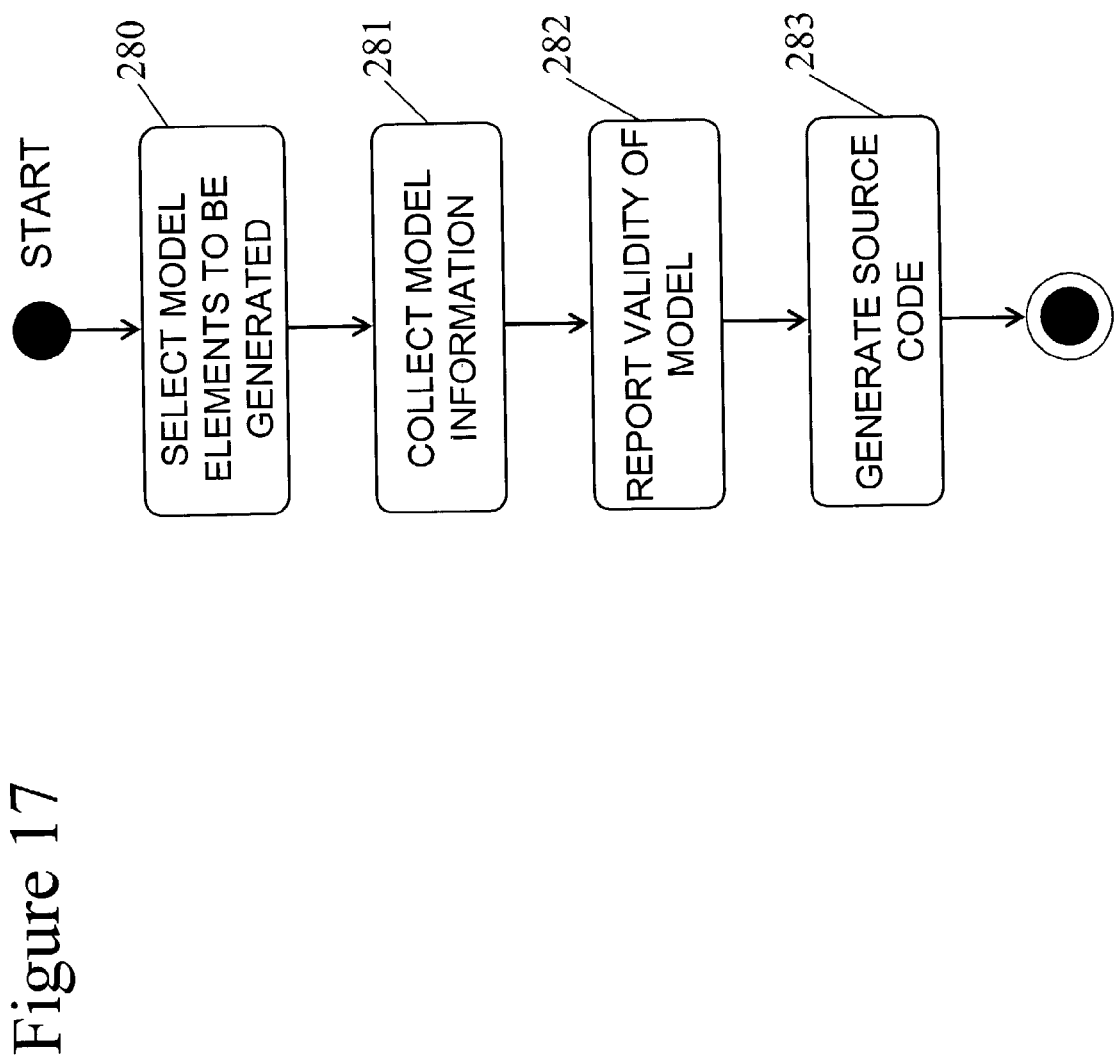
FIG. 17 shows the activities required to generate code from a design model fully decorated with properties.

At step 225, the developer selects a part of or the whole model for code generation. FIG. 17 illustrates this activity in a detailed manner. Note that even though this activity appears to be the penultimate activity, since software development is an iterative activity, this activity occurs throughout the evolution of the application.

At step 280, the developer selects the portion of the model for which code will be generated. The portion can be the complete model, if appropriate. The atomic unit of selection is a model element.

At step 281, all of the information about the selected model elements is collected.

At step 282, the extracted information is validated against the architecture specification. Nonconformity may appear because model elements have been added without being fully specified, or it may have crept in if the legal values have changed but all the existing model elements have not been revisited. Nonconformity is reported to the developer, who then has the choice to continue the generation process or not.

At step 283, the extracted information is provided to a code generator such as Codagen Gen-it™ Generator or other prior art code generation systems. Better code generation systems preserve unaffected parts of the code base.

Finally, at step 226, developers extend the code that was just generated. This code can then be compiled or deployed as appropriate to the nature of the system.

FIG. 18 illustrates how multiple competing architecture layers can be exchanged. For example, suppose a system addresses general accounting problems. The domain is identical for each system. However the client determines which database should host the system. In this case, the database layer would be specified for each layer, possibly with different structures. These layers would be exchanged to generate different systems. Most of the activities in FIG. 18 are similar to the corresponding activities in FIG. 12.

At step 284, the developer replaces an architectural layer within an existing architecture specification by specifying the replaced layer as he did in activity 246. If the architectural issues are completely analogous between the layers, then there is no work to do. (In fact, if the architectural issues are satisfactory, and the properties chosen remain satisfactory, then the only remaining aspect is the implementation of the resulting code, which can be addressed by modifying the code generation.) If not, then some or all of the issues and/or properties must be respecified for this layer.

As an example of a case requiring no change in the architectural issues, consider the situation of redeploying an application from a test environment to a production environment. In the test environment, certain actions need delays to simulate real-life or worst-case scenarios. In a production environment, these delays must be removed.

As an example of a case requiring a change in the architectural issues, consider the situation of redeploying a system with a new version of a third-party database. In this architecture, this is the responsibility of the Persistent Layer. In the old system, certain table accesses would experience unacceptable performance. The old system flagged these accesses as requiring homemade processing. The new version of the database addresses this problem, but it requires two pieces of information. First, it needs the data-caching algorithm, and then it needs a hint as to the usage of the table such as read-only, read-mostly, write-mostly.

At step 285, the developer makes a new set of properties only for the replaced layer. By the end of this activity, the model is again completely specified with the new properties and their respective content. Neither the properties in other layers nor the domain model is affected by this activity.

At step 286, the developer generates code. See step 225 for more details.

At step 287, the developer customizes the code. See step 226 for more details.

B—UML™ Profile for Specifying Business Processes

UML™ has been shown to be useful for representing different views of systems at different levels of detail. It provides expressive graphical diagrams that permit modeling of the static and dynamic views of systems and are suitable for business modeling and application system design. However, this expressiveness has rendered UML™ complex and consequently not appropriate for business analysts.

UML™ is often criticized because of the complexity of the notation. The learning curve could be very steep before one is able to start working with UML, especially for business analysts who are responsible for gathering business requirements. The present invention can also be used to abstract UML™ modeling tools in order to easily define a business domain-specific UML™ profile without losing the advantages of visual modeling provided by UML. A UML™ profile is a set of extension mechanisms (stereotypes and properties called tagged values) for tailoring the notation to a specific business domain. In this section, we present a UML™ profile for a business process and business document modeling.

The UML™ profile has a Business layer, which contains three issues: Scenario, Process, and Document.

The stereotypes that are defined in this profile are described in Table 1. Note that an icon is preferably assigned to each stereotype to ease working with the UML™ profile.

TABLE 1

Defined Stereotypes

| Stereotype | Model element type | Description |
|---|---|---|
| MultipartyCollaboration | Package | Model of a collaboration between several trading partners |
| WebService | Package | Model of a Web Service provided by a trading partner |
| XDR | Package | Model of a business document |
| Service | Class | Representative of the Web Service within the model |
| Message | Class | A description of the unit of communication exchanged between trading partners |
| Role | Class | A role played by a trading partner |
| dataType | Class | A data type |
| elementType | Class | An element type as described by XDR schemas |
| attributeType | Class | An attribute type as described by XDR schemas |
| oneWay | Class, Activity state | A one-way operation |
| Notification | Class, Activity state | A notification operation |
| requestResponse | Class, Activity state | A request-response operation |
| solicitResponse | Class, Activity state | A solicit-response operation |
| Msmq | Class | A msmq binding to a port type |
| Com | Class | A com binding to a port type |
| Script | Class | A script binding to a port type |
| Restriction | Generalization relationship | The specialized type restricts the generalized type |
| Extension | Generalization relationship | The specialized type extends the generalized type |
| Required | Association | The attribute is required for the element type |
| Optional | Association | The attribute is optional for the element type |
| Element | Association | An element of the element type |
| Operation | Association | Operation provided by a port type |
| Port | Association | Port provided by a Web Service |
| Porttype | Association | Port type of a Web Service |
| Implements | Association | Links a port type with a binding and describes how the port type is implemented |
| Input | Association | Input message of an operation |
| Output | Association | Output message of an operation |
| Fault | Association | Message transmitted by an operation in case of error |
| Provides | Association | Gives information about which trading partner provides a Web Service |
| Context | Activity state | Contextual process |
| While | Activity state | While process |
| Abort | Final state | An abort of the process |
| Switch | Branch state | Switch processes |
| Pick | Branch state | Pick processes |

TABLE 1-continued

Defined Stereotypes

| Stereotype | Model element type | Description |
| --- | --- | --- |
| Fork | Fork state | The starting point of concurrent threads |
| Or | Join state | The synchronization point of concurrent threads. Only one thread needs to get the point in order for the process to go to the next state |
| All | Join state | The synchronization point of concurrent threads. All threads need to get the point in order for the process to go to the next state |
| Synchronous | Message flow | Synchronous message exchanged between two trading partners |
| Asynchronous | Message flow | Asynchronous message exchanged between two trading partners |
| Transaction | Message flow | A transaction of messages exchanged between two trading partners |
| binaryCollaboration | Message flow | A set of messages and transactions exchanged between two trading partners |
| Case | Transition | Case branch of a switch process |
| Default | Transition | Default branch of a switch process |
| eventHandler | Transition | Modeling the awaiting of the arrival of an event in the context of pick processes |
| Compensation | Activity model | Compensation process for context processes |
| Exception | Activity model | Exception process for context processes |
| Compensate | Activity state | Compensate activity |

Some terms used in the above table are defined below:

The XML Data Reduced (XDR) is a language for describing XML schemas provided by Microsoft.

MSMQ is Microsoft's message queuing server. MSMQ can be used as a message broker to transmit messages (self-describing data structures) from one application to another.

The Component Object Model (COM) is Microsoft's framework for developing and supporting program component objects. It is aimed at providing similar capabilities to those defined in the Common Object Request Broker Architecture (CORBA), a framework for the interoperation of distributed objects in a network that is supported by other major companies in the computer industry. Whereas Microsoft's Object Linking and Embedding provides services for the component document that users see on their display, COM provides the underlying services of interface negotiation, life cycle management (determining when an object can be removed from a system), licensing, and event services (putting one object into service as the result of an event that has happened to another object).

The pick process awaits the arrival of one of a set of events and then executes a process form associated with that message. The form of pick is a set of branches of the form event/process, and exactly one of the branches will be selected based on the occurrence of the event associated with it. It is very similar to a switch except that the conditions for the branches are events that may or may not occur. If more than one of the events occurs there is a race and the choice of branch to be executed is dependent on both timing and implementation. The possible events are the arrival of some message at a given port in the form of the invocation of an input or request/response operation, or the completion of a delay action.

A branch pseudo-state with stereotype branch is a UML element in a state machine in which a single trigger leads to more than one possible outcome, each with its own guard condition.

ACID (atomicity, consistency, isolation, and durability) is an acronym for learning and remembering the four primary attributes ensured to any transaction by a transaction manager (which is also called a transaction monitor). These attributes are:

Atomicity: In a transaction involving two or more discrete pieces of information, either all of the pieces are committed or none are.

Consistency: A transaction either creates a new and valid state of data, or, if any failure occurs, returns all data to its state before the transaction was started.

Isolation: A transaction in process and not yet committed must remain isolated from any other transaction.

Durability: Committed data is saved by the system such that, even in the event of a failure and system restart, the data is available in its correct state.

The Simple Object Access Protocol (SOAP) is a way for a program running in one kind of operating system (such as Windows XP) to communicate with a program in the same or another kind of an operating system (such as Linux) by using the World Wide Web's Hypertext Transfer Protocol (HTTP) and its Extensible Markup Language (XML) as the mechanisms for information exchange. Since Web protocols are installed and available for use by all major operating system platforms, HTTP and XML provide an already at-hand solution to the problem of how programs running under different operating systems in a network can communicate with each other. SOAP specifies exactly how to encode an HTTP header and an XML file so that a program in one computer can call a program in another computer and pass it information. It also specifies how the called program can return a response.

The Hypertext Transfer Protocol (HTTP) is the set of rules for exchanging files (text, graphic images, sound, video, and other multimedia files) on the World Wide Web. Relative to the TCP/IP suite of protocols (which are the basis for information exchange on the Internet), HTTP is an application protocol.

Essential concepts that are part of HTTP include (as its name implies) the idea that files can contain references to other files whose selection will elicit additional transfer requests. Any Web server machine contains, in addition to the HTML and other files it can serve, an HTTP daemon, a program that is designed to wait for HTTP requests and handle them when they arrive. Your Web browser is an HTTP client, sending requests to server machines. When the browser user enters file requests by either "opening" a Web file (typing in a Uniform Resource Locator) or clicking on a hypertext link, the browser builds an HTTP request and sends it to the Internet Protocol address indicated by the URL. The HTTP daemon in the destination server machine receives the request and, after any necessary processing, the requested file is returned.

BizTalk is an industry initiative headed by Microsoft to promote XML as the common data exchange language for e-commerce and application integration on the Internet. While not a standards body per se, the group is fostering a common XML message-passing architecture to tie systems together. BizTalk says that the growth of e-commerce requires businesses using different computer technologies to have a means to share data. Accepting XML as a platform-neutral way to represent data transmitted between computers, the BizTalk group provides guidelines, referred to as the BizTalk Framework, for how to publish schema (standard data structures) in XML and how to use XML messages to integrate software programs.

In addition to Microsoft, other vendors such as SAP and CommerceOne are supporting BizTalk. Microsoft offers BizTalk Server 2000, which can implement XML-based data integration. The server software includes tools to create and design XML definitions, map data from one definition to another, and manage process flow, document verification, and data exchange and processing.

Figure 19:
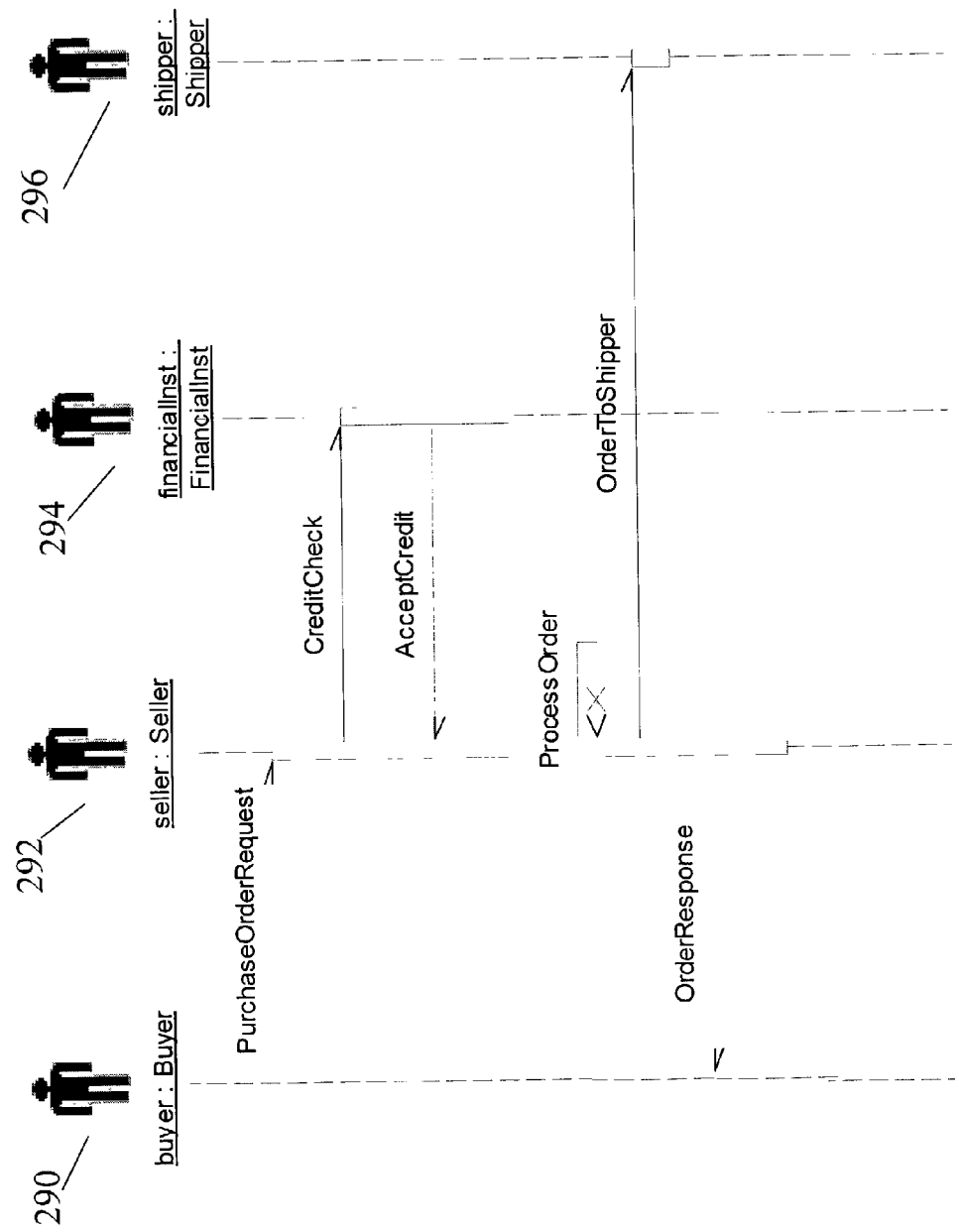
FIG. 19 shows an example of a business scenario.

Business scenarios are modeled as UML™ sequence diagrams (for simple cases) or as UML™ activity diagrams (for complex cases). FIG. 19 shows an example of a sequence diagram modeling the business scenario "Purchase Order". A business scenario is a set of messages exchanged between trading partners. Four types of messages are possible:

Synchronous: modeled as message flow with stereotype "synchronous";

Asynchronous: modeled as message flow with stereotype "asynchronous";

Transaction: modeled as message flow with stereotype "transaction";

Binary collaboration: modeled as message flow with stereotype "binaryCollaboration".

Condition names and expressions of conditional messages are captured respectively in the properties conditionName and conditionExpression of the issue Scenario.

Graphically, a UML™ sequence diagram is a table that shows objects arranged along the X axis and messages, ordered in increasing time, along the Y axis. Four trading partners are involved in the scenario of FIG. 19: a buyer 290, a seller 292, a financial Institution 294 and a shipper 296. The buyer sends a message PurchaseOrderRequest to the seller, the latter verifies the solvency of the buyer by sending a message CreditCheck to the financial institution. In this scenario, the financial institution accepts the credit. As soon the seller receives the AcceptCredit message, he processes the order and sends a request to the shipper to ship the order. Finally, he sends a response to the buyer about his purchase order request.

Figure 20:
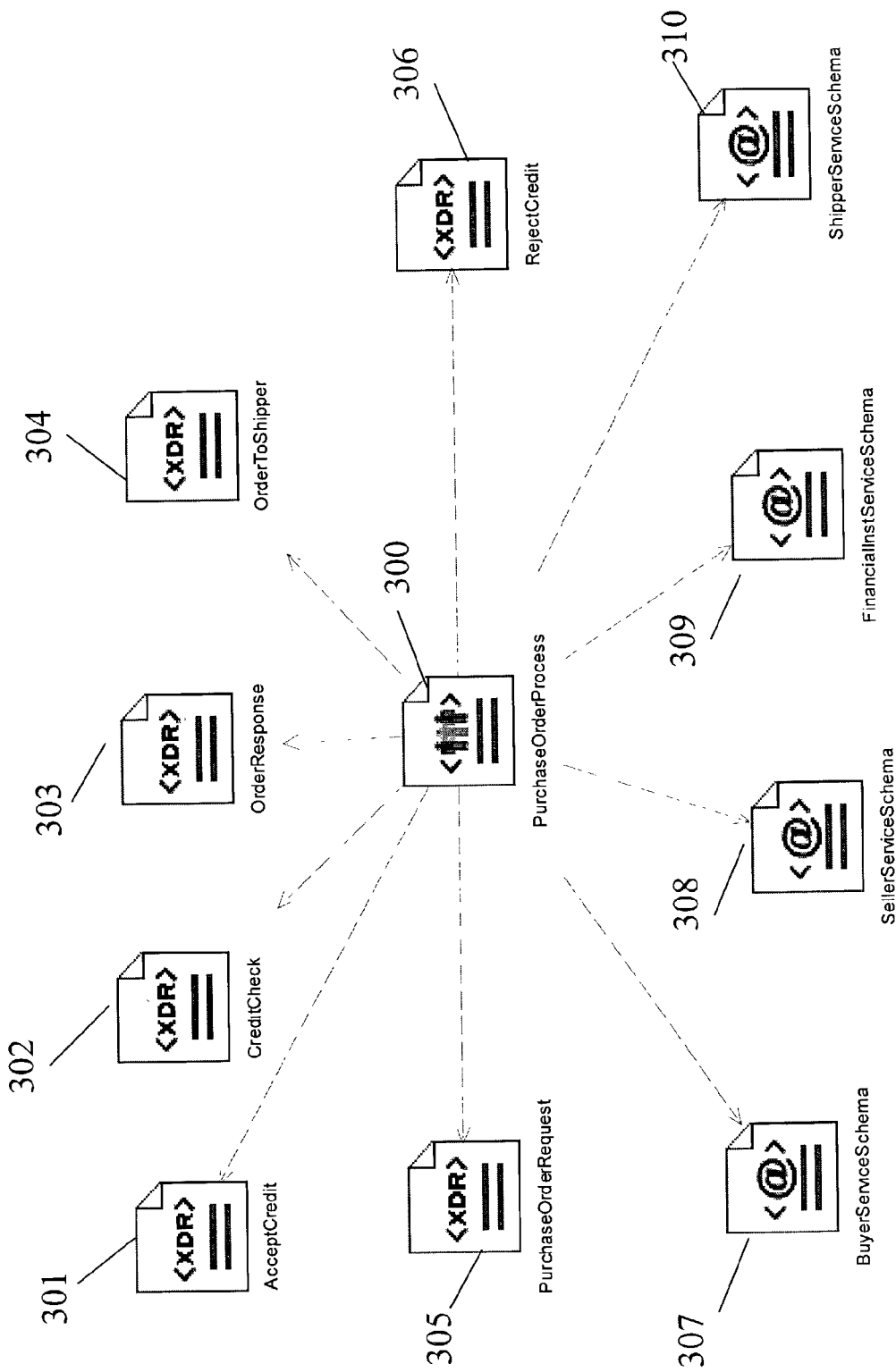
FIG. 20 shows a business process which is a multi-party contract between trading partners interacting through business documents. Each interaction is mapped with a Web service.

Business processes are modeled as packages with stereotype "MultipartyCollaboration" and are viewed as a multi-party contract where the parties are interacting through business documents (see FIG. 20). Each interaction is mapped to a Web service. FIG. 20 shows a high level view of the purchase order process 300. This process reuses four web services, which are the buyer service 307, the seller service 308, the financial institution service 309 and the shipper service 310; and six business documents, which are PurchaseOrderRequest 305, AcceptCredit 301, CreditCheck 302, OrderResponse 303, OrderToShipper 304 and RejectCredit 306. The workflow of a business process is modeled as a set of business scenarios. The synthesis of those scenarios is modeled as a UML™ activity diagram. Depending on the type of an activity within the workflow, the activity is modeled as an activity state with stereotype either "oneWay", "requestResponse", "solicitResponse", or "notification".

Figure 21:
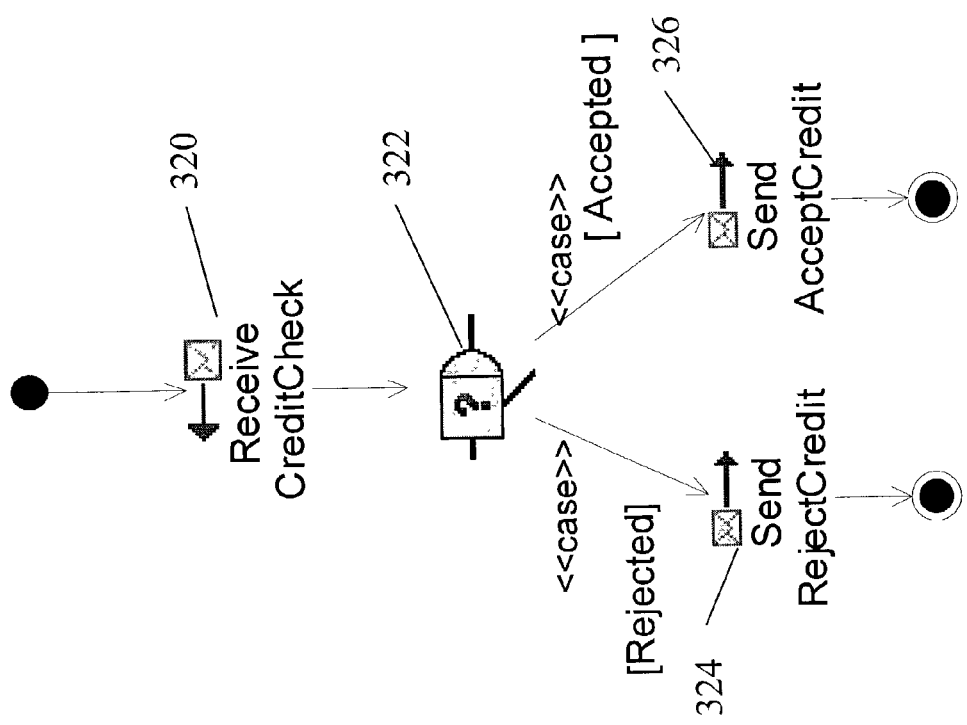
FIG. 21 shows an example of a switch process.

A switch process is modeled as a branch state with stereotype <<switch>>. The ordering of the branches is recorded in a property "sequenceNumber" of the issue "Process" defined for the transition element type. A transition coming from a switch pseudo-state has a stereotype case or default in order to differentiate between case branches and the default one. Conditions of case branches are expressed as guard conditions of their corresponding transitions. Conditions are expressed as a property conditionExpression assigned to the transition element type. FIG. 21 shows a UML™ activity diagram describing the workflow of the financial institution Web service. When the financial institution receives a credit check message 320, two branches are possible 322. If the credit is accepted, the financial institution sends an accept credit message 326, otherwise it sends a reject credit message 324.

A "while" process is modeled as an activity state "while". The looping process is modeled as sub-activities of the "while" activity state. The loop condition name and expression are saved respectively in the properties "conditionName" and "conditionExpression" of the issue "Process". The latter properties are also assigned to activity states.

Concurrent threads are modeled using synchronization bars. Threads issue from a synchronization bar with stereotype "fork" and are brought back together by a synchronization bar with stereotype "all".

A "pick" process is modeled as a branch state with stereotype "pick". A transition coming from a "pick" pseudo-state has a stereotype "eventHandler" modeling the wait for the arrival of an event. The event is expressed in the event part of a transition. A property "eventType" with the possible values "oneWay", "requestResponse", "solicitResponse", or notification is used to record the type of the event. This property belongs to the issue "Process".

A context process, which provides a framework for local declarations as well as exception handling and transactional behaviour, is modeled as an activity state with stereotype "context". The compensation process for context processes is modeled as sub-activity graphs with stereotype "compensation" of the context activity state, whereas the exception processes are modeled as sub-activity graphs with stereotype "exception". The property transactionType with the value 'ACID' or 'LRT' records whether a transaction process is ACID or a long-running transaction. Note that the compensate action is expressed as an activity state with stereotype "compensate". The property transactionName records the transaction referenced by the compensate action. The properties transactionType and transactionName belong also to the issue Process.

A particular Web service is defined as a package with stereotype "WebService". Its representative is created as a class with stereotype "service". A Web service is a group of related ports that specifies a transport endpoint at which a binding is deployed. Six binding types are supported in the profile: SOAP binding, HTTP binding, COM binding, Script binding, Message Queuing binding and Biztalk Messaging binding. A SOAP binding is modeled as classes with stereotype "soap", HTTP binding as classes with stereotype "http", COM binding as classes with stereotype "com", Script binding as classes with stereotype "script", Message Queueing binding as classes with stereotype "msmq", and finally Biztalk Messaging binding as classes with stereotype "biztalkMessaging". A port is described as an aggregation relationship with stereotype "port" between the service class and the binding class.

A binding implements a port type. The latter is a named set of abstract operations, defined using abstract messages. A port type is modeled as a class with stereotype porttype.

An operation is a basic interaction pattern supported by a Web service. Four transmission primitives that an endpoint can support are as follows:

One-way. The endpoint receives a message. A One-way operation is modeled as a class with stereotype "oneWay".

Request-response. The endpoint receives a message and sends a correlated message. A Request-response operation is modeled as a class with stereotype "requestResponse".

Solicit-response. The endpoint sends a message and receives a correlated message. A Solicit-response operation is modeled as a class with stereotype "solicitResponse".

Notification. The endpoint sends a message. A Notification operation is modeled as a class with stereotype "notification".

The input (respectively, the output) message of an operation is recorded as a relationship with stereotype "input" (respectively, "output") between the class representing the operation and that of the message. When an operation reports an error message, the information is recorded as a relationship with stereotype "fault" between the class representing the operation and that of the message.

Figure 22:
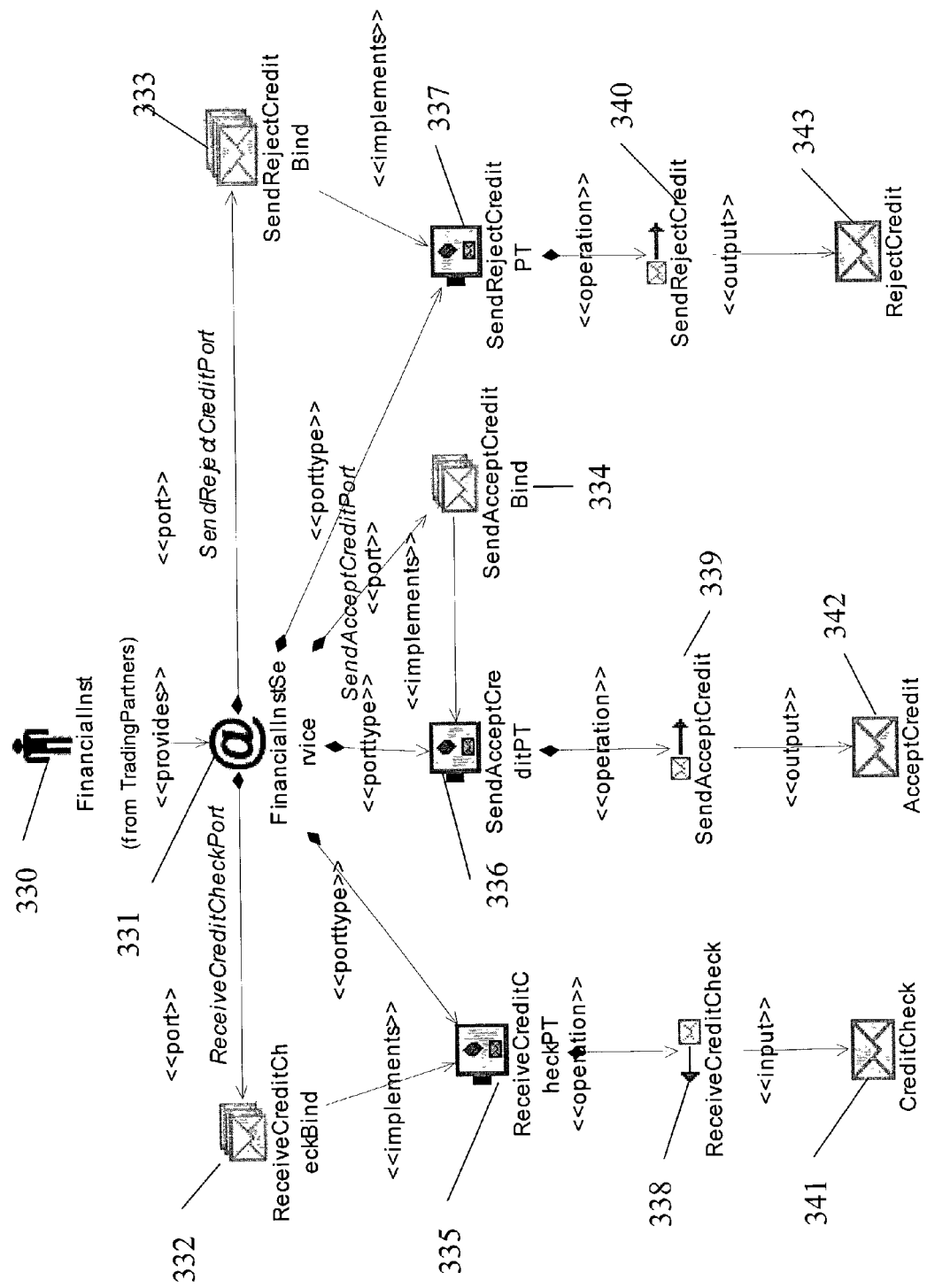
FIG. 22 shows an example of a Web Service.

A message is a potentially multi-part package of documents and context data that constitutes the unit of communication with a Web service. A message is described as a class with stereotype "message". The different parts of a message are modeled as aggregation relationships with stereotype "part" between the message and the classes that model the types of the elements constituting the different part documents. FIG. 22 describes the service 331 provided by the financial institution 330. This services has four porttypes:

The port type ReceiveCreditCheckPT 335 is implemented by a msmq binding 332 and has one oneway operation ReceiveCreditCheck 338. The latter has as input the message CreditCheck 341.

The port type SendAcceptCreditPT 336 is implemented by a msmq binding 334 and has one notification operation SendAcceptCheck 339. The latter outputs the message AcceptCredit 342.

The port type SendRejectCreditPT 337 is implemented by a msmq binding 333 and has one notification operation SendRejectCheck 340. The latter outputs the message RejectCredit 343.

A business document is modeled as a package with stereotype "XDR". The namespace of the business document is captured in the property "namespace" of the issue Document. This property is assigned to packages.

An element type of a business document is modeled as a class with stereotype "elementtype". When the element type restricts another type, a generalization relationship with stereotype "restriction" connects the two types. When the element type extends another type, a generalization relationship with stereotype "extension" connects the two types.

An element of an element type is modeled as an aggregation relationship with stereotype "element" between the element type and the type of the element. A sequence number of an element is recorded in the property "sequenceNumber" of the issue Document. This property is linked to an aggregation relationship.

A required attribute of an element type is modeled as an association with stereotype "required" between the element type and the type of the element. An optional attribute of an element type is modeled as an association with stereotype "optional" between the element type and the type of the element.

A primitive data type is modeled as a class with stereotype "datatype".

Figure 23:
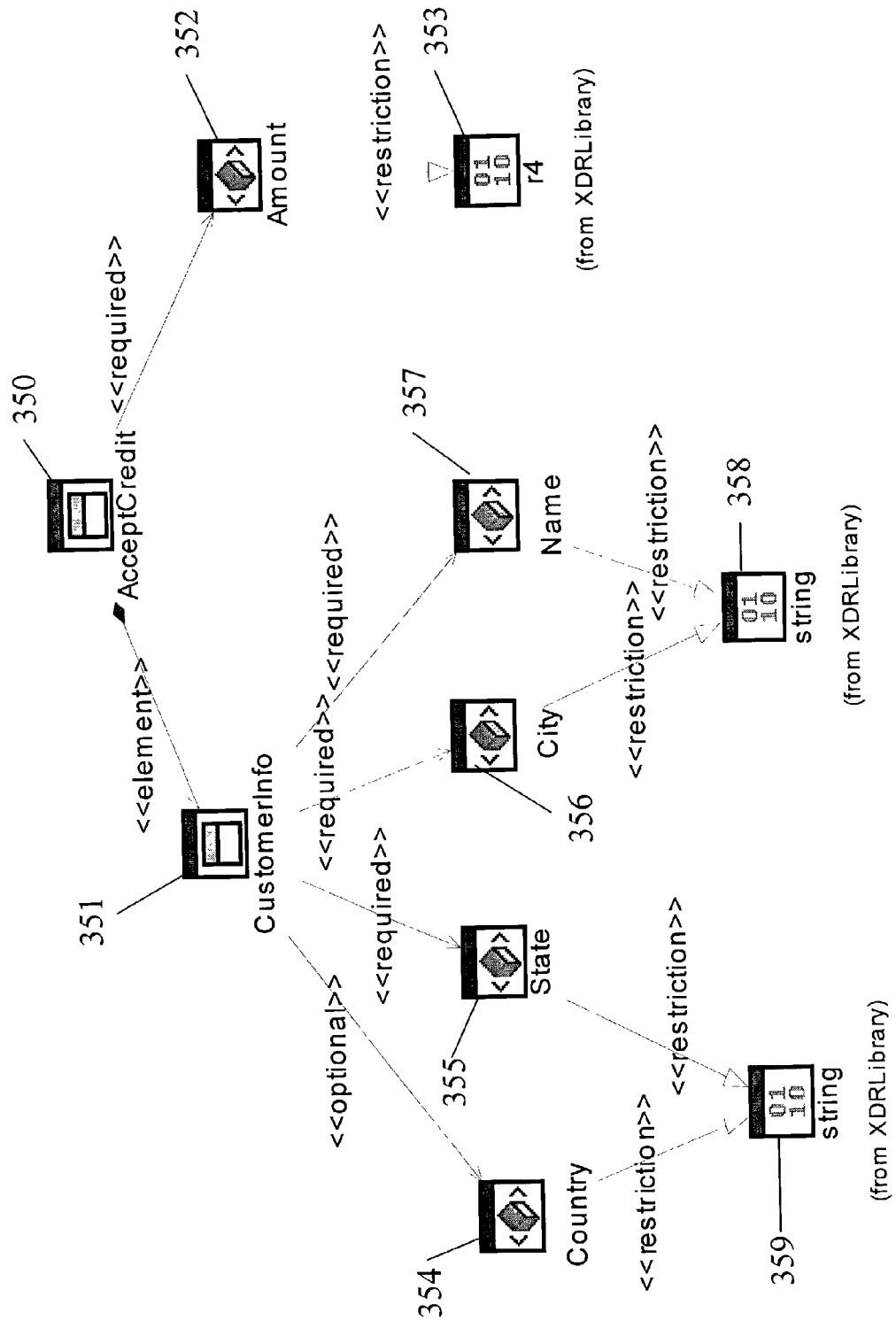
FIG. 23 shows an example of a business document.

An attribute type is modeled as a class with stereotype "attributeType". The attribute type restricts either a data type or another attribute type. This information is modeled as a generalization relationship with stereotype "restriction", which connects the two types. FIG. 23 shows the AcceptCredit business document 350. This document has one element CustomerInfo 351 and one attribute Amount 352 of type r4 353. The CustomerInfo element has four attributes: the attribute Country 354 of type string 359, the attribute State 355 of type string 359, the attribute City 356 of type string 358, and the attribute Name 357 of type string 358.

While illustrated in the block diagrams as groups of discrete components communicating with each other via distinct data signal connections, it will be understood by those skilled in the art that the preferred embodiments are provided by software, hardware and/or a combination of hardware and software components, with some components being implemented by a given function or operation of a hardware or software system, and many of the data paths illustrated being implemented by data communication within a computer application or operating system. The structure illustrated is thus provided for efficiency in the teaching of the present preferred embodiment.

It should be noted that the present invention can be carried out as a method, can be embodied in a system, a computer readable medium or an electrical or electromagnetic signal.

It will be understood that numerous modifications thereto will occur to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A computational method for modeling and storing specifications of a software model, comprising:

providing a first computer module, specifying an architectural definition of at least one architectural layer for a software model;

storing in a computer-readable medium said architectural definition of said at least one architectural layer;

providing a second computer module, specifying a definition of at least one property of at least one element type of said software model;

storing in said computer-readable medium the definition of said at least one element type of said software model;

providing a third computer module, establishing relations between the definition of said at least one property of said software model to said at least one architectural layer;

storing in said computer-readable medium said relations; and providing a fourth computer module and a man-machine interface, automatically providing assistance in specifying property contents of said at least one property using said at least one architectural layer for which said relations are established with said at least one property.

2. A method as claimed in claim 1, wherein automatically providing assistance further comprises indicating which of said at least one architectural layer correspond to said at least one property for which said property contents are being specified.

3. A method as claimed in claim 2, wherein specifying said property contents comprises specifying said property contents with default values.

4. A method as claimed in claim 1, further comprising storing in said computer-readable medium said property contents.

5. A method as claimed in claim 4, wherein said computer-readable medium comprises a plurality of computer-readable medium, each being configured for one of said at least one architectural layer.

6. A method as claimed in claim 4, further comprising importing to said software model an architectural layer defined in a different software model.

7. A method as claimed in claim 4, wherein automatically providing assistance further comprises deleting in said computer-readable medium a portion of said property contents related to said at least one architectural layer.

8. A method as claimed in claim 4, wherein automatically providing assistance further comprises copying from said computer-readable medium a portion of said data property contents related to said at least one architectural layer into another computer-readable medium.

9. A method as claimed in claim 4, wherein automatically providing assistance further comprises replacing a portion of said property contents related to one of said at least one architectural layer with a corresponding portion of property contents related to one of said at least one architectural layer of another software model.

10. A method as claimed in claim 3, wherein automatically providing assistance comprises reporting a coherency between each said computer-readable medium and a structure definition of said at least one architectural layer.

11. A method as claimed in claim 1, wherein said specifying the definition of at least one property comprises a) specifying at least one architectural issue in which said at least one property is grouped, and b) storing said at least one property according to said at least one architectural issue, wherein automatically providing assistance comprises providing access to said at least one property according to a selection among said at least one architectural issue.

12. A method as claimed in claim 11, wherein automatically providing assistance comprises directing a user to specify property contents within said selection of said at least one architectural issue.

13. A method as claimed in claim 11, wherein said at least one architectural issue comprises an independent name space.

14. A method as claimed in claim 11, wherein said at least one architectural issue comprises associating element type properties with said at least one architectural layer.

15. A method as claimed in claim 11, wherein specifying the definition of at least one property comprises associating said at least one architectural issue with one of said at least one architectural layer.

16. A method as claimed in claim 11, wherein automatically providing assistance comprises re-specifying at least one architectural issue and grouping properties of said at least one architectural issue in said re-specified at least one architectural issue.

17. A method as claimed in claim 11, wherein automatically providing assistance comprises grouping said properties in another architectural issue.

18. A method as claimed in claim 1, wherein said automatically providing assistance comprises selecting at least one of said at least one architectural layer and specifying property contents for said selected at least one architectural layer.

19. A method as claimed in claim 1, wherein automatically providing assistance comprises retrieving at least one previously specified and related property.

20. A method as claimed in claim 19, further comprising editing said retrieved property.

21. A method as claimed in claim 1, further comprising importing to said software model an architectural layer defined in a different software model.

22. A method as claimed in claim 21, further comprising editing said imported architectural layer.

23. A method as claimed in claim 21, further comprising specifying that said imported architectural layer is to remain unchanged.

24. A method as claimed in claim 21, wherein said automatically providing assistance comprises, providing default contents to said imported architectural layer.

25. A method as claimed in claim 1, wherein automatically providing assistance comprises disallowing updating ef property contents by architectural layer.

26. A method as claimed in claim 1, wherein automatically providing assistance comprises disallowing viewing property contents by architectural layer.

27. A method as claimed in claim 1, further comprising a) allowing at least a portion of said software model to be processed by any of said software modules and b) exporting said processed portion of said software model.

28. A method as claimed in claim 27, wherein said exporting comprises exporting said processed portion of said software model to a report generator.

29. A method as claimed in claim 27, wherein said exporting comprises exporting said processed portion of said software model to a software model validation module.

30. A method as claimed in claim 27, wherein exporting said processed portion of said software model comprises preparing an export file for said software model and said property contents in a XML format.

31. A method as claimed in claim 1, further comprising processing and exporting a portion of said software model to a code generator.

32. A method as claimed in claim 1, wherein automatically providing assistance comprises re-specifying at least one element type property and relating said at least one re-specified property to another architectural layer.

33. A method as claimed in claim 1, wherein specifying the definition of at least one property comprises renaming said at least one property.

34. A method as claimed in claim 33, wherein automatically providing assistance comprises renaming said at least one property.

35. A method as claimed in claim 33, wherein automatically providing assistance comprises changing a presentation of said at least one property for viewing and exporting according to said naming.

36. A method as claimed in claim 1, wherein specifying the definition of at least one property further comprises specifying a dependency of said at least one property to another property forming part of said at least one property and wherein automatically providing assistance comprises directing the user to specify property contents for said at least one property according to said dependency.

37. A method as claimed in claim 1, further comprising specifying at least one layer to be edited, said at least one layer to be edited forming part of said at least one architectural layer.

38. A method as claimed in claim 1, further comprising specifying at least one layer to remain unchanged, said at least one layer to remain unchanged forming Dart of said at least one architectural layer.

39. A method as claimed in claim 1, wherein automatically providing assistance comprises, for at least one layer forming Dart of said at least one architectural layer, providing default contents.

40. A method as claimed in claim 1, wherein specifying the definition of at least one property comprises specifying a property name describing a design decision and a property content describing a value of said design decision.

41. A method as claimed in claim 40, wherein specifying the definition of at least one property further comprises specifying a set of predefined values for a given property name and a given model element.

42. A method as claimed in claim 1, wherein said specifying an architectural definition of at least one architectural layer comprises receiving a layer specification signal and a property specification signal.

43. A method as claimed in claim 1, wherein automatically providing assistance comprises sending an assistance signal.

44. A system for modeling and storing specifications of a software model, comprising:
   a first computer module configured to specify an architectural definition of at least one architectural layer for a software model;
   a second computer module configured to specify the definition of at least one property of at least one element type of said software model;
   a third computer module configured to establish relations between the definition of said at least one property of said software model to said at least one architectural layer;
   a fourth computer module and a man-machine interface to automatically assist in specifying property contents of said at least one property using a said at least one architecture layer for which said relations are established to said at least one property; and
   a computer-readable medium to store a) said architectural definition of said at least one architectural layer, b) said definition of said at least one element type of said software model, c) said relations, and d) said property contents.

45. A system as claimed in claim 44, wherein said fourth computer module further comprises a display for indicating which of said at least one architectural layer correspond to said at least one property for which said property contents are being specified.

46. A system as claimed in claim 44 wherein said computer-readable medium comprises a plurality of computer-readable data repositories, each being configured to store one of said at least one architectural layer.

47. A system as claimed in claim 44, wherein said said second computer module further comprises:
   a fifth computer module configured to specify at least one architectural issue in which at least one property is grouped;
   a computer-readable issue medium for storing said properties according to said architectural issue; and
   an issue selector for selecting an architectural issue;
   wherein said fourth computer module provides access to said properties according to the selected architectural issue.

48. A system as claimed in claim 47, wherein said fourth computer module directs a user to specify property contents within said selected architectural issue.

49. A system as claimed in claim 47, wherein said at least one architectural issue comprises properties associated with different architectural layer.

50. A system as claimed in claim 44, wherein said fourth computer module selects at least one of said at least one architectural layer and specifies property contents for said selected architectural layer.

51. A system as claimed in claim 42, wherein said fourth computer module retrieves at least one previously specified and related property.

52. A system as claimed in claim 44, further comprising an editor for editing said at least one property.

53. A system as claimed in claim 44, wherein said fourth computer module disallows viewing of property contents by architectural layer.

54. A system as claimed in claim 44, further comprising a software model exporter for exporting at least a portion of said software model; whereby allowing further processing of said portion by software modules.

55. A system as claimed in claim 54, wherein said software model exporter prepares an export file for said software model and said property contents in a XML format.

56. A system as claimed in claim 44, further comprising a sixth computer module configured to specify a dependency of said at least one property to another one of said at least one property and wherein said fourth computer module directs the user to specify property contents for said at least one property according to said dependency.

57. A system for modeling and storing specifications of a software model, comprising:
   a layer specification signal receiver for receiving a layer specification signal specifying an architectural definition of at least one architectural layer for a software model;
   a property specification signal receiver for receiving a property specification signal specifying the definition of at least one property of at least one element type of said software model;
   a first computer module, establishing relations between the definition of said at least one property of said software model to said at least one architectural layer;
   a second computer module and a man-machine interface to automatically in specifying property contents of said at least one property using said at least one architecture layer for which said relations are established to said at least one property; and
   a computer-readable medium to store a) said architectural definition of said at least one architectural layer, b) said definition of said at least one element type of said software model, c) said relations, and d) said property contents.

58. A system for modeling and storing specifications of a software model, comprising:
   a layer specification signal receiver for receiving a layer specification signal specifying an architectural definition of at least one architectural layer for a software model;

a property specification signal receiver for receiving a property specification signal specifying the definition of at least one property of at least one element type of said software model;

a computer module, establishing relations between the definition of said at least one property of said software model to said at least one architectural layer;

an assistance requester computer module configured to request an assistance signal providing assistance for specifying property contents of said at least one property using said at least one architecture layer for which said relations are established to said at least one property; and a computer-readable medium to store a) said architectural definition of said at least one architectural layer, b) said definition of said at least one element type of said software model, c) said relations, and d) said property contents.

\* \* \* \* \*